United States Patent
Kim et al.

(10) Patent No.: US 10,270,641 B2
(45) Date of Patent: Apr. 23, 2019

(54) APPARATUS AND METHOD FOR REDUCING PEAK-TO-AVERAGE POWER RATIO IN WIRELESS COMMUNICATION SYSTEM

(71) Applicants: Samsung Electronics Co., Ltd., Suwon-si, Gyeonggi-do (KR); POSTECH ACADEMY-INDUSTRY FOUNDATION, Pohang-si, Gyeongsangbuk-do (KR)

(72) Inventors: Chanhong Kim, Suwon-si (KR); Jubum Kim, Pohang-si (KR); Yeohun Yun, Hwaseong-si (KR); Joon Ho Cho, Pohang-si (KR)

(73) Assignees: Samsung Electronics Co., Ltd., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 15/863,319

(22) Filed: Jan. 5, 2018

(65) Prior Publication Data

US 2018/0198668 A1 Jul. 12, 2018

(30) Foreign Application Priority Data

Jan. 6, 2017 (KR) .................. 10-2017-0002502
Mar. 23, 2017 (KR) .................. 10-2017-0037170

(51) Int. Cl.
*H04L 5/12* (2006.01)
*H04L 27/34* (2006.01)
*H04B 7/08* (2006.01)
*H04B 7/06* (2006.01)

(52) U.S. Cl.
CPC ........ *H04L 27/3411* (2013.01); *H04B 7/0617* (2013.01); *H04B 7/0854* (2013.01)

(58) Field of Classification Search
CPC .. H04L 27/3411; H04B 7/0617; H04B 7/0854
USPC ....... 375/222, 232, 233, 227, 260, 261, 267, 375/285, 346, 350; 370/201, 203, 210, 370/329, 342
See application file for complete search history.

(56) References Cited

U.S. PATENT DOCUMENTS

| | | | |
|---|---|---|---|
| 8,149,969 B2 | 4/2012 | Khan et al. | |
| 9,673,881 B2* | 6/2017 | Tomeba | ............... H04B 7/0626 |
| 2007/0081604 A1* | 4/2007 | Khan | .................... H04L 5/023 375/261 |

(Continued)

OTHER PUBLICATIONS

"DFT-Spread OFDM with Pulse Shaping Filter in Frequency Domain in Evolved UTRA Uplink"; R1-050102; London, UK, Aug. 29, 2005.

*Primary Examiner* — Dhaval V Patel
(74) *Attorney, Agent, or Firm* — Jefferson IP Law, LLP

(57) ABSTRACT

The present disclosure relates to a pre-$5^{th}$-generation (5G) or 5G communication system to be provided for supporting higher data rates Beyond $4^{th}$-generation (4G) communication system, such as long-term evolution (LTE). An operation method of a transmitter in a wireless communication system is provided. The method includes applying a filter to data, mapping the data to which the filter is applied to at least one subcarrier, and transmitting the mapped data to a receiver. The filter is determined based on based on the allocated resource.

15 Claims, 24 Drawing Sheets

(56) References Cited

U.S. PATENT DOCUMENTS

| | | | |
|---|---|---|---|
| 2014/0029511 A1* | 1/2014 | Park | H04L 27/2631 370/328 |
| 2015/0270884 A1* | 9/2015 | Tomeba | H04B 7/0417 370/329 |
| 2016/0112238 A1* | 4/2016 | Ling | H04B 10/50 375/261 |
| 2017/0134205 A1 | 5/2017 | Kim et al. | |
| 2018/0054332 A1* | 2/2018 | Kuchi | H04L 25/03834 |

* cited by examiner

APPARATUS AND METHOD FOR REDUCING PEAK-TO-AVERAGE POWER RATIO IN WIRELESS COMMUNICATION SYSTEM

CROSS-REFERENCE TO RELATED APPLICATION(S)

This application claims the benefit under 35 U.S.C. § 119(a) of a Korean patent application filed on Jan. 6, 2017 in the Korean Intellectual Property Office and assigned Serial number 10-2017-0002502 and of a Korean patent application filed on Mar. 23, 2017 in the Korean Intellectual Property Office and assigned Serial number 10-2017-0037170, the entire disclosure of each of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) POSTECH ACADEMY-INDUSTRY FOUNDATION.

TECHNICAL FIELD

The present disclosure relates to a wireless communication system. More particularly, the present disclosure relates to a method and an apparatus for reducing a peak-to-average power ratio (PAPR) in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency millimeter wave (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A communication technology required by next-generation Internet of things (IoT) technology includes IoT or the like, which has characteristics significantly different from those of a cellular communication system according to the related art. More particularly, the cellular communication system uses a data rate, quality of service (QoS), or the like as yardsticks of quality of communication according to the related art. The IoT environment needs to secure a large number of connectivities, and a peak-to-average power ratio (PAPR) is considered an important factor that can reduce driving power since a mobile device is made smaller, limitations associated with a battery exist, and the like. In addition, in order to increase the coverage area of next-generation mobile communication and to secure the performance of a user at the edge of a cell, a power boost is required. The magnitude of a power boost that is possible is closely related to a PAPR due to the nonlinearity of a power amplifier, and reduction of the PAPR is directly related to the performance of increasing the coverage area.

Therefore, a need exists for a method and an apparatus for reducing a peak-to-average power ratio (PAPR) in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides a method and an apparatus for efficiently reducing the peak-to-average power ration (PAPR) of a signal in a wireless communication system.

Another aspect of the present disclosure is to provide a method and an apparatus for reducing the PAPR of a signal transmitted from a transmitter of a wireless communication system.

Another aspect of the present disclosure is to provide a method and an apparatus for reducing the PAPR of a signal transmitted from a transmitter of a wireless communication system and increasing a transmission rate of data.

Another aspect of the present disclosure is to provide a method and an apparatus for reducing the PAPR of a signal received by a receiver of a wireless communication system.

Another aspect of the present disclosure is to provide a method and an apparatus for reducing the PAPR of a signal received by a receiver of a wireless communication system and increasing a reception rate of data.

In accordance with an aspect of the present disclosure, an operation method of a transmitter in a wireless communication system is provided. The operation method includes identifying a resource allocated for transmitting data to a receiver, applying a filter to the data, mapping the data to which the filter is applied to one or more subcarriers, converting the mapped data to time-domain data, and transmitting the converted time-domain data. The filter is determined based on the allocated resource, and may be shared by the transmitter and the receiver.

In accordance with another aspect of the present disclosure, an operation method of a transmitter in a wireless communication system is provided. The operation method includes applying a filter to data, mapping the data to which the filter is applied to at least one subcarrier, and transmitting the mapped data to a receiver. The filter is determined based on an allocated resource.

In accordance with another aspect of the present disclosure, an operation method of a receiver in a wireless communication system is provided. The operation method includes receiving data from a transmitter, applying a transformation matrix to the data, and decoding the data to which the transformation matrix is applied. The transformation matrix may be determined based on a filter shared by the transmitter and the receiver. The filter may be determined based on the receiver characteristics and reception performance of the receiver.

In according with another aspect of the present disclosure, an apparatus of a transmitter in a wireless communication system is provided. The apparatus includes a transceiver, and at least one processor coupled with the transceiver. The at least one processor may control to apply a filter to data, map the data to which the filter is applied to at least one subcarrier, and transmit the mapped data to the receiver. The filter may be determined based on the receiver characteristics and on the reception performance of the receiver.

In accordance another aspect of the present disclosure, an apparatus of a receiver in a wireless communication system is provided. The apparatus includes a transceiver, and at least one processor coupled with the transceiver. The at least one processor may control to receive data, apply a transformation matrix, and decode data to which the transformation matrix is applied. The transformation matrix may be determined based on a filter shared by the transmitter and the receiver. The filter may be determined based on the receiver characteristics and on the reception performance of the receiver.

A method and an apparatus according to various embodiments of the present disclosure can reduce a PAPR by performing filtering set by taking into consideration a reception performance gain of a receiver.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure relates to a method and an apparatus for transmitting and receiving a signal in a wireless communication system. More particularly, the present disclosure describes various embodiments for reducing a peak-to-average power ratio (PAPR) in a wireless communication system.

In the following descriptions, terms (e.g., "transmitter" and "receiver") indicating network entities, terms indicating signal processing means (e.g., "filter"), terms (e.g., "communication unit" and "controller") indicating elements of an apparatus, and the like are illustrated for ease of description.

Therefore, the present disclosure may not be limited by the terms provided below, and other terms that have equivalent technical meanings can be used.

Figure 1:
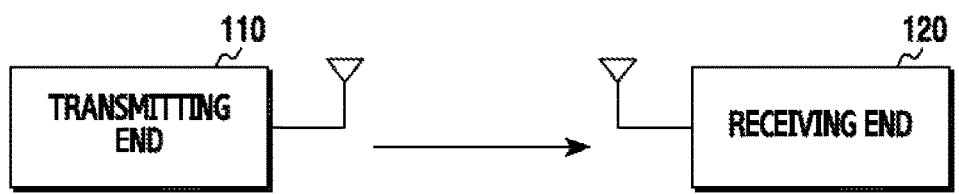
FIG. 1 is a diagram illustrating a wireless communication system according to various embodiments of the present disclosure.

FIG. 1 is a diagram illustrating a wireless communication system according to various embodiments of the present disclosure.

Referring to FIG. 1, a transmitter 110 and a receiver 120 as some of nodes that use a radio channel in a wireless communication system are illustrated. Although FIG. 1 illustrates one transmitter 110 and one receiver 120, a plurality of transmitters or a plurality of receivers may be included. In addition, although it is illustrated that the transmitter 110 and the receiver 120 are separate entities in the present document, for ease of description, the function of the transmitter 110 may be changed with the function of the receiver 120. For example, in an uplink of a cellular communication system, the transmitter 110 may be a terminal and the receiver 120 may be a base station. In a downlink, the transmitter 110 may be a base station and the receiver 120 may be a terminal. A method of reducing a PAPR according to various embodiments of the present disclosure may also be applicable to a downlink as well as an uplink.

The transmitter 110 and the receiver 120 may transmit and receive a wireless signal in a millimeter-wave (mmWave) band (e.g., 28 GHz, 30 GHz, 38 GHz, and 60 GHz). In this instance, to improve a channel gain, the transmitter 110 and the receiver 120 may perform beamforming. Here, the beamforming may include transmission beamforming and reception beamforming. For example, the transmitter 110 and the receiver 120 may assign directivity to a transmission signal or a reception signal. To this end, the transmitter 110 and the receiver 120 may select at least one serving beam through a beam search procedure. According to various embodiments of the present disclosure, due to the high frequency of the millimeter wave band, excellent PAPR reduction performance may be required.

In addition, a wireless communication system according to various embodiments of the present disclosure may provide a service that requires massive terminal access. Here, the service may be referred to as a massive machine-type communication (mMTC) service. For example, the mMTC service may be used for the internet of things (IoT). The mMTC service may require broad coverage area in order to provide services to a massive number of terminals. According to various embodiments of the present disclosure, the transmitter 110 and the receiver 120 are apparatuses for the mMTC service, and may be required to have excellent PAPR reduction performance since the apparatuses are made smaller and battery capacity is limited.

A PAPR is an important yardstick for determining the driving power of a mobile device. In the case of a high PAPR, serious distortion may occur when passes through a non-linear element, such as an analog-to-digital converter (ADC), a digital-to-analog converter (DAC), a power amplifier, or the like, and thus high-performance elements may be required and costs may be increased. In addition, although a high-performance element that satisfies linearity is used, when an element affiliated with a field-effect transistor (FET), such as a complementary metal oxide semiconductor (CMOS), is used, the voltage needs to be sufficiently high, whereby the amount of power consumed may be increased. Therefore, when the PAPR of a transmission signal is high, there is a high probability of a big problem occurring in an uplink in the state in which power and battery capacity are limited. More particularly, in the mMTC environment of $5^{th}$-generation (5G) communication, in which a significantly large number of low-power devices is expected to require access, it is required to lower the PAPR. In $4^{th}$-generation (4G) communication (e.g., long-term evolution (LTE)), PAPR is reduced using a discrete Fourier transform (DFT)-spread-OFDM (DFT-S-OFDM) having a uni-subcarrier characteristic, instead of using orthogonal frequency division multiplexing (OFDM) with a high PAPR. In the next-generation mobile communication, broader coverage area is required, and technologies for improving the performance of a piece of user equipment at the edge of a cell through power boosting are taken into consideration. However, the DFT-S-OFDM scheme is insufficient to perform power boosting from the perspective of the performance of a PAPR and the performance of an amplifier. According to the various technologies, technologies of cutting off a signal that exceeds the maximum value even though distortion occurs, or technologies of providing additional frequency resources have been proposed in order to reduce a PAPR according to the related art. However, the present disclosure provides a method of reducing a PAPR without provision of additional frequency resources by modifying the DFT-S-OFDM. In addition, the present disclosure provides a method of minimizing a decrease in reception performance by modifying the structure of a receiver.

According to various embodiments of the present disclosure, a PAPR may be reduced by designing both a transmitter and a receiver. More particularly, by designing a receiver (e.g., a base station) that is relatively free from the perspective of complexity in an uplink for the reduction of a PAPR, in addition to designing a transmitter, the PAPR of a signal processed by the receiver may be reduced, and the reception performance of the signal may be improved. In addition, additional frequency resources may not be needed, and a PAPR may be further reduced by allocating additional frequency resources when needed. In addition, the performance of a PAPR may be further reduced by sacrificing reception performance when needed.

More particularly, according to various embodiments of the present disclosure, the transmission and reception of a binary phase shift keying (BPSK) symbol having improper characteristics will be described as an example. However, the scope of the present disclosure is not limited to the transmission and reception of a BPSK symbol, and may be applicable to the transmission and reception of a symbol having improper characteristics, or to a different type of symbol. When the pseudo covariance matrix of a symbol vector is a zero matrix (0), the symbol vector is considered proper. When the pseudo covariance matrix of the symbol vector is different from the zero vector, the symbol vector is considered improper. A PAPR reduction scheme according to various embodiments of the present disclosure may convert, into a PAPR gain, a reception performance gain obtained by applying a widely linear receiver that uses impropriety of a BPSK symbol. In order to convert the reception performance gain into a PAPR, a transmitter or a receiver according to various embodiments of the present disclosure may determine a transmitter filter and the amount of phase rotation that is appropriate for the situation (e.g., allocated frequency resources).

Figure 2:
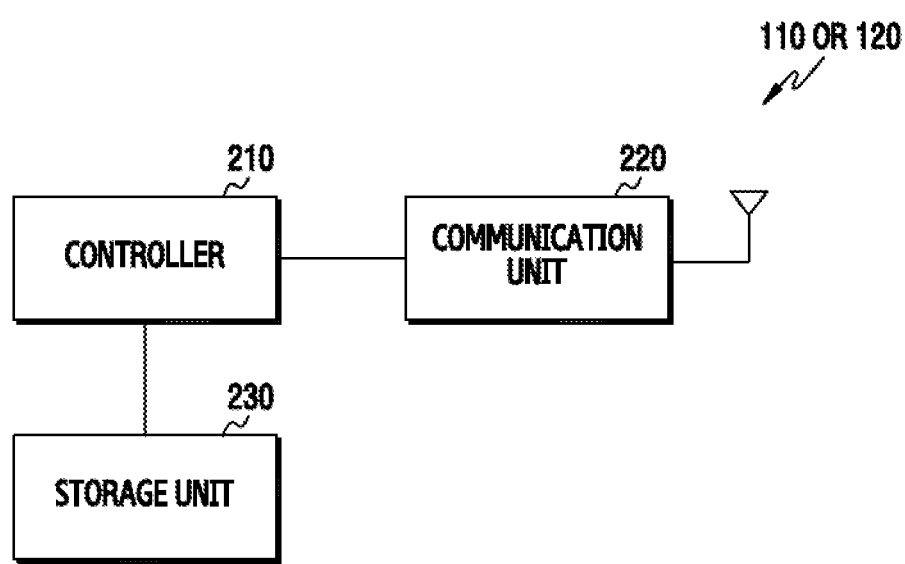
FIG. 2 is a diagram illustrating a configuration of an apparatus in a wireless communication system according to various embodiments of the present disclosure.

FIG. 2 is a diagram illustrating a configuration of an apparatus in a wireless communication system according to various embodiments of the present disclosure. For example, the configuration of FIG. 2 may be representative of the configuration of the transmitter 110 or of the receiver 120. Hereinafter, terms, such as '-unit', suffixes, such as '-er', '-or', and the like indicate a unit that processes at least one function or operation, which may be embodied by hardware, software, or a combination thereof.

Referring to FIG. 2, the apparatus may include a controller 210, a communication unit 220, and a storage unit 230.

The controller 210 may control the operation of the apparatus. For example, the controller 210 may transmit and receive a signal through the communication unit 220. In addition, the controller 210 may record data in or read data from the storage unit 230. To this end, the controller 330 may include at least one processor or micro-processor, or may be a part of the processor. In addition, a part of the communication unit 220 and the controller 210 may be referred to as a communication processor (CP). More particularly, according to various embodiments of the present disclosure, the controller 210 may control the communication unit 220 such that an operation for reducing a PAPR associated with the modulation or demodulation of a signal is performed. In other words, the controller 210 may control the operation of elements included in the communication unit 220. For example, the controller 210 may perform control such that the transmitter 110 or the receiver 120 performs operations according to various embodiments provided below.

The communication unit 220 may execute functions for transmitting and receiving signals through a wireless channel. For example, the communication unit 220 may perform a function of conversion between a baseband signal and a bit stream according to the physical layer standard of a system. For example, when data is transmitted, the communication unit 220 encodes and modulates a transmission bit stream, so as to generate complex symbols. In addition, when data is received, the communication unit 220 reconstructs a reception bit stream by demodulating and decoding a baseband signal. In addition, the communication unit 220 up-converts a baseband signal into a radio frequency (RF) band signal and transmits the same through an antenna, and down-converts an RF band signal received through an antenna into a baseband signal.

For example, the communication unit 220 may include a transmission filter, a reception filter, an amplifier, a mixer, an oscillator, a DAC, an ADC, and the like. In addition, the communication unit 220 may include a plurality of transmission/reception paths. Furthermore, the communication unit 220 may include at least one antenna array including a plurality of antenna elements. From the perspective of hardware, the communication unit 220 may include a digital unit and an analog unit, and the analog unit may include a plurality of sub-units based on an operating power, an operating frequency, or the like.

The communication unit 220 may transmit and receive a signal as described above. Accordingly, the communication unit 220 may also be referred to as a transmitting unit, a receiving unit, or a transceiver. In addition, the transmission and reception performed through a wireless channel, which is described below, may mean that the above-described processing is performed by the communication unit 220. In addition, the communication unit 220 may include a backhaul communication unit for communication with another network entity connected through a backhaul network.

The storage unit 230 may store data, such as a basic program, an application program, configuration information, and the like for operating the apparatus. The storage unit 230 may be configured as volatile memory, non-volatile memory, or a combination of volatile memory and non-volatile memory. In addition, the storage unit 230 may provide data stored therein in response to a request from the controller 210.

Figure 3:
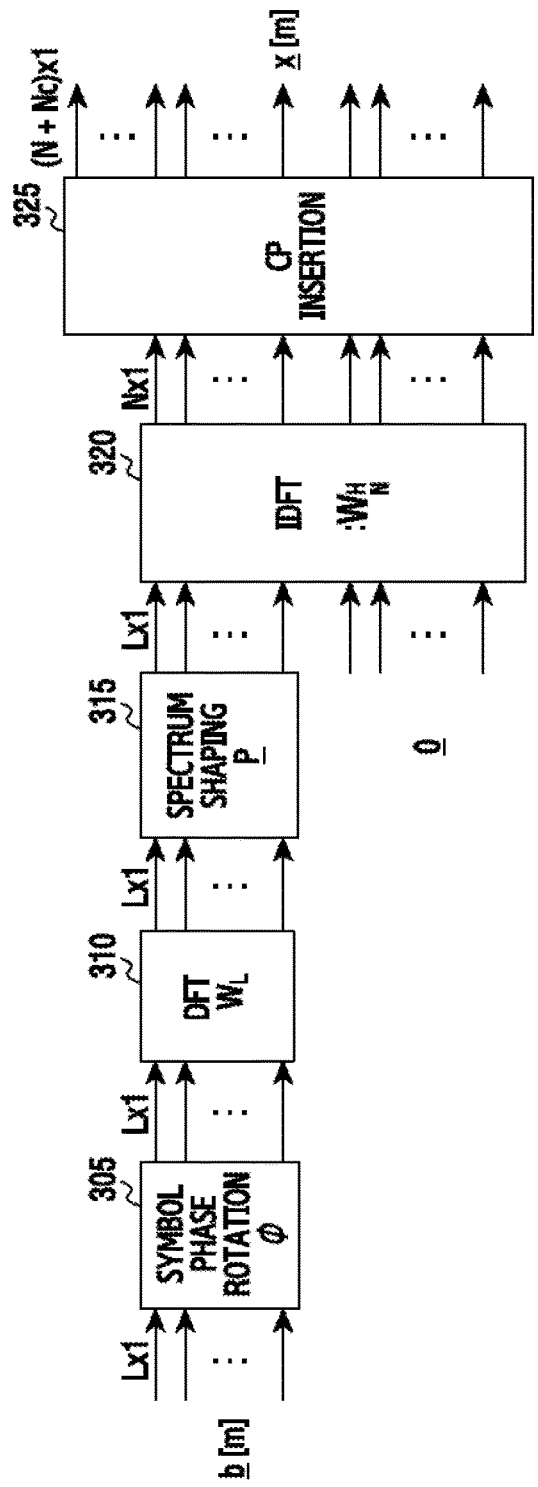
FIG. 3 is a diagram illustrating a configuration of a communication unit of a transmitter in a wireless communication system according to various embodiments of the present disclosure.

FIG. 3 is a diagram illustrating a configuration of a communication unit of a transmitter in a wireless communication system according to various embodiments of the present disclosure.

Referring to FIG. 3, be construed as a part of the configuration of the communication unit 220. The communication unit of the transmitter 110 of FIG. 3 may include a symbol-phase rotation block 305, a DFT block 310, a spectrum-shaping block 315, an inverse DFT (IDFT) block 320, and a cyclic prefix (CP) insertion block 325.

The symbol-phase rotation block 305 may rotate the phase of a transmission symbol. According to various embodiments of the present disclosure, the amount of phase rotation ϕ may be determined based on the number of data symbols to be transmitted within an OFDM symbol, that is, the size of a DFT. By rotating the phase of a transmission symbol by the symbol-phase rotation block 305, an in-phase interpolation interference probability may be reduced in terms of time. As the in-phase interpolation interference probability decreases in terms of time, the PAPR of a signal to be transmitted may be reduced.

Referring to FIG. 3, the phase rotation of ϕ may be performed with respect to L data symbols. In other words, the symbol-phase rotation block 305 may receive an input of L data symbols, may convert the phase of each data symbol, and may output the L data symbols, the phases of which are converted, to the DFT block 310.

The DFT block 310 may perform DFT with respect to the data symbols provided from the symbol-phase rotation block 305 so as to convert the data symbols to data in the frequency domain. Referring to FIG. 3, the DFT block 310 may receive input of L data symbols from the symbol-phase rotation block 305, may convert the L data symbols into L pieces of frequency-domain data, and may output the data to the spectrum-shaping block 315.

The spectrum-shaping block 315 may filter the frequency-domain data which are converted by the DFT block 310. According to various embodiments of the present disclosure, the filter of the spectrum-shaping block 315 may be configured to reduce the PAPR of a signal modulated by the transmitter 110 and to satisfy a predetermined reception performance of the receiver 120. In other words, the spectrum-shaping block 315 may receive input of frequency-domain data from the DFT block 310, and may output, to the IDFT block 320, data on which filtering has been performed using a filtering matrix. FIG. 3 illustrates an example when additional frequency resources are not allocated in order to reduce a PAPR, and the spectrum-shaping block 315 may output L pieces of filtered data, the number of which is the same as L, corresponding to the number of pieces of input data. According to other embodiments of the present disclosure, when additional frequency resources are allocated to reduce a PAPR, the spectrum-shaping block 315 may convert L pieces of input data to K pieces of data, K being greater than L.

Although FIG. 3 illustrates the DFT block 310 and the spectrum-shaping block 315 as separate blocks, the DFT block 310 and the spectrum-shaping block 315 may be configured as one block. For example, the DFT operation and filtering of L pieces of data provided from the symbol-phase rotation block 305 may be simultaneously performed using one filtering matrix. Here, filtering may be defined as K-point circular filtering.

The IDFT block 320 may convert the data provided from the spectrum-shaping block 315 into time-domain data. Referring to FIG. 3, the IDFT block 320 may apply an IDFT matrix $W_N^H$ to the data provided from the spectrum-shaping block 315 so as to convert the data into N pieces of time-domain data. The time-domain data converted by the IDFT block 320 may be provided to the CP insertion block 325.

The CP insertion block 325 may insert a CP to the time-domain data. Referring to FIG. 3, the CP insertion block 325 may add $N_C$ CPs in addition to the N symbols that are converted to the time-domain data by the IDFT block 320, and may output a transmission signal vector x[m] having (N+$N_C$) entries. The transmission signal vector x[m] may be up-converted by an RF module (not illustrated), and may be transmitted to the receiver 120 through an antenna.

According to various embodiments of the present disclosure, a phase rotation value and a filter coefficient may be determined based on the PAPR performance of the transmitter 110 and the reception performance of the receiver 120. More particularly, the phase rotation value and the filter coefficient may be determined as values that minimize the probability of the PAPR of the transmitter 110 exceeding a predetermined value, and may also satisfy an orthogonality condition of a transmission symbol.

Figure 4:
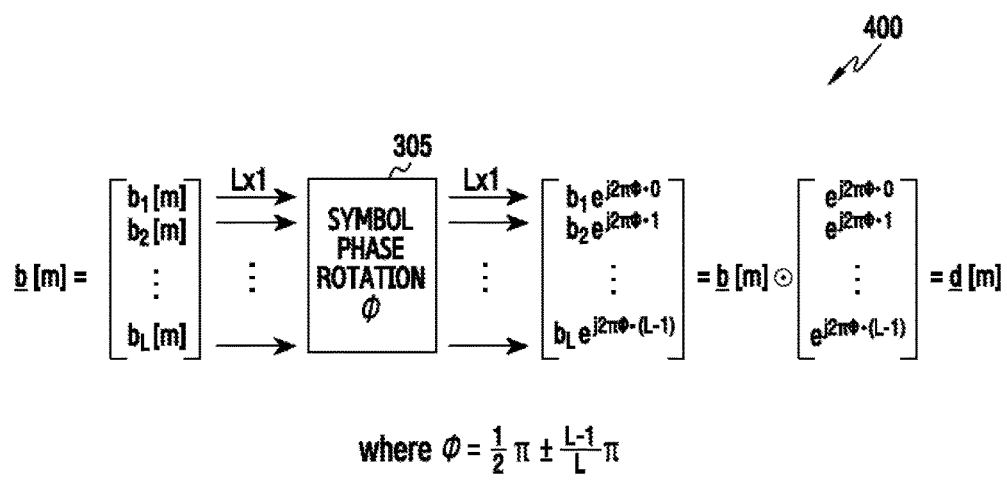
FIG. 4 is a diagram illustrating input and output by a phase rotation block of a transmitter in a wireless communication system according to various embodiments of the present disclosure.

FIG. 4 is a diagram illustrating input and output by a phase rotation block of a transmitter in a wireless communication system according to various embodiments of the present disclosure. FIG. 4 illustrates an example of operation of the symbol-phase rotation block 305 of FIG. 3.

Referring to FIG. 4, a BPSK data symbol vector b[m] including L entries may be converted to a data symbol vector d[m], the phase of which is rotated in a symbol phase rotation operation 400. More particularly, as illustrated in FIG. 4, the symbol-phase rotation block 305 may receive input of the BPSK data symbol vector b[m], and may output a data symbol vector d[m], the phase of which is rotated according to Equation 1 provided below.

$$\underline{b}[m] \odot \begin{bmatrix} e^{j\phi \cdot 0} \\ e^{j\phi \cdot 1} \\ \vdots \\ e^{j\phi \cdot (L-1)} \end{bmatrix} = \underline{d}[m] \qquad \text{Equation 1}$$

In Equation 1, b[m] denotes a BPSK data symbol vector, ϕ denotes the amount of phase rotation, and d[m] denotes a data symbol vector the phase of which is rotated. Here, the phase rotation value ϕ may be parameterized in association with L, corresponding to the number of data symbols, as shown in Equation 2 provided below.

$$\phi = \frac{1}{2}\pi \pm \frac{L-1}{L}\pi \qquad \text{Equation 2}$$

In Equation 2, ϕ denotes the amount of phase rotation, and L denotes the number of data symbols to be transmitted within an OFDM symbol. In other words, the phase rotation value ϕ may be determined based on L, which is the number of data symbols to be transmitted within an OFDM.

Figure 5A:
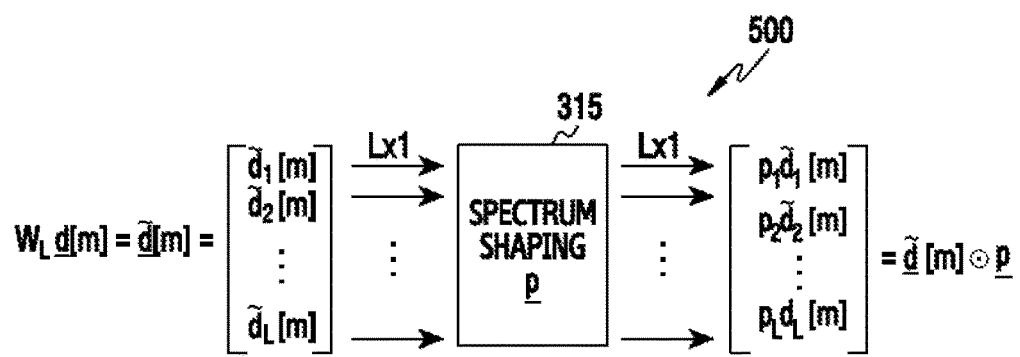
FIG. 5A is a diagram illustrating input and output by a filter block of a transmitter in a wireless communication system according to various embodiments of the present disclosure.

FIG. 5A is a diagram illustrating input and output by a filter block of a transmitter in a wireless communication system according to various embodiments of the present disclosure. FIG. 5A illustrates an example of the operation of the spectrum-shaping block 315 of FIG. 3.

Referring to FIG. 5A, a data vector d[m] which is converted to the frequency domain by multiplying, by an L-point DFT matrix $W_L$, a data symbol vector d[m], the phase of which is rotated, may be input to the spectrum-shaping block 315. A spectrum-shaping vector $\underline{p}$ is applied to the data vector $\underline{\tilde{d}}[m]$ converted to the frequency domain through a spectrum-shaping operation 500, and the data vector is output. The vector output by the spectrum-shaping block 315 may be determined by Equation 3 provided below.

$$\begin{bmatrix} p_1 \tilde{d}_1[m] \\ p_2 \tilde{d}_2[m] \\ \vdots \\ p_L \tilde{d}_L[m] \end{bmatrix} = \underline{\tilde{d}}[m] \odot \underline{p} \quad \text{Equation 3}$$

In Equation 3, $\underline{\tilde{d}}[m]$ denotes a data vector converted to the frequency domain. $\underline{p}$ denotes a spectrum-shaping vector. $p_1$, $p_2, \ldots, p_L$ denotes spectrum shaping coefficients or filter coefficients included in a spectrum-shaping vector. A vector $\underline{\tilde{d}}[m] \odot \underline{p}$ to which the spectrum-shaping vector is applied may be output to an N-point IDFT block (e.g., the IDFT block 320 of FIG. 3).

Although the embodiments of FIGS. 3 and 5A describe separate application of a DFT matrix and a spectrum-shaping vector, a matrix in which the DFT matrix and the spectrum-shaping vector are combined may be applied according to other embodiments. Here, the matrix in which the DFT matrix and the spectrum-shaping vector are combined may be defined as a filter matrix $S$ or $S_{opt}$. The filter matrix may be defined by Equation 4 provided below.

$$(S)_{i,j} = p_i e^{-j\frac{2\pi(i-1)(j-1)}{L}} \quad \text{Equation 4}$$

In Equation 4, $p_i$ denotes a filter coefficient. i denotes a frequency index. j denotes a symbol index. L denotes the number of data symbols to be transmitted within an OFDM symbol. According to various embodiments of the present disclosure, the filter matrix may be configured in the form of a circular filter. The coefficients $p_i$ included in the filter matrix may be defined as shown in FIG. 5B or FIG. 5C.

Figure 5B:
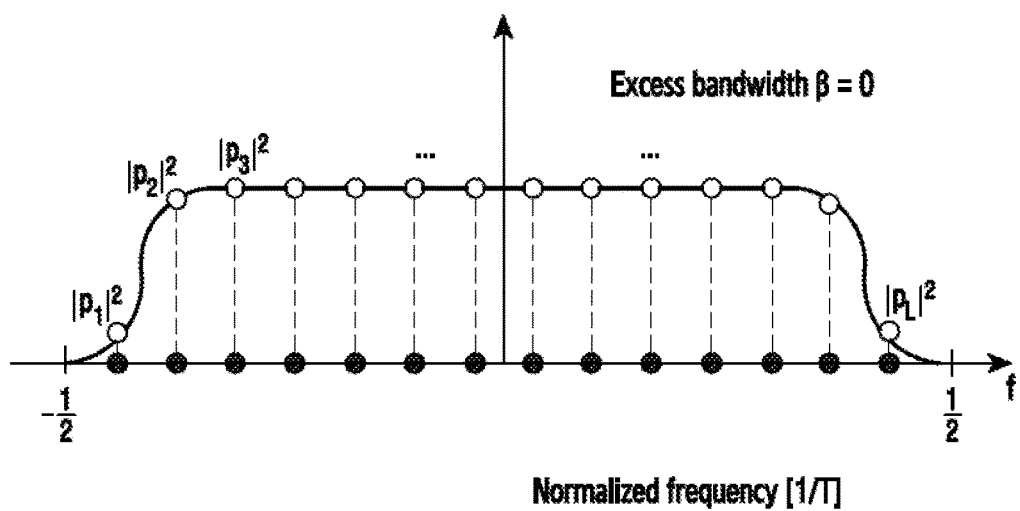
FIG. 5B is a diagram illustrating a filter when additional frequency resources are not allocated by a transmitter in a wireless communication system according to various embodiments of the present disclosure.

FIG. 5B is a diagram illustrating a filter when additional frequency resources are not allocated by a transmitter in a wireless communication system according to various embodiments of the present disclosure.

Referring to FIG. 5B, the horizontal axis corresponds to a normalized frequency value. The vertical axis corresponds to the square of the absolute value of a filter coefficient $p_i$. The example of FIG. 5B corresponds to the case in which additional frequency resources are not allocated ($\beta=0$), and thus a frequency (K) allocated for data symbol transmission may be the same as L, corresponding to the number of data symbols to be transmitted within an OFDM symbol. In FIG. 5B, a frequency index i is an integer, which is greater than or equal to 1 and less than or equal to L, corresponding to the number of data symbols to be transmitted within an OFDM symbol.

Figure 5C:
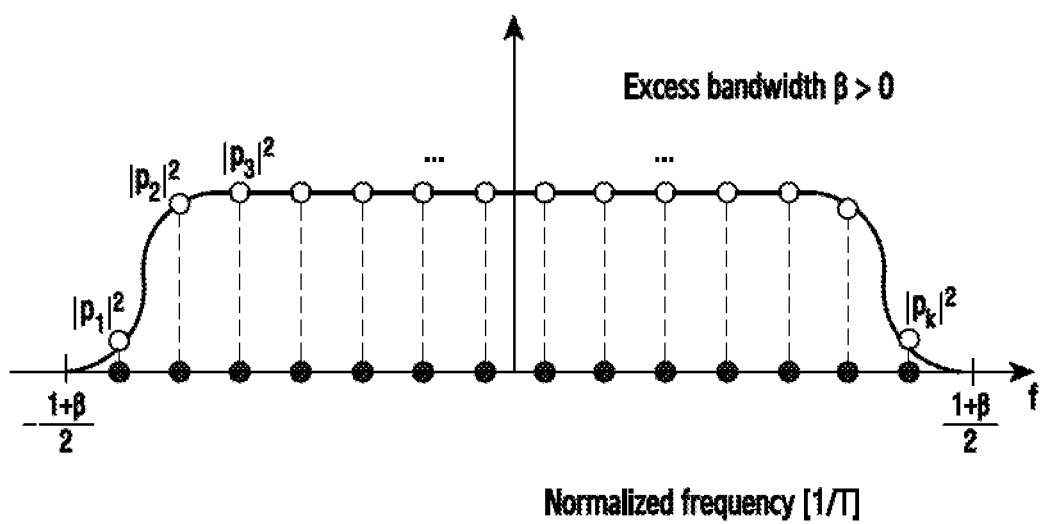
FIG. 5C is a diagram illustrating a filter when additional frequency resources are allocated by a transmitter in a wireless communication system according to various embodiments of the present disclosure.

FIG. 5C is a diagram illustrating a filter when additional frequency resources are allocated by a transmitter in a wireless communication system according to various embodiments of the present disclosure.

Referring to FIG. 5C, the horizontal axis corresponds to a normalized frequency value. The vertical axis corresponds to the square of the absolute value of a filter coefficient $p_i$. The example of FIG. 5C corresponds to the case in which additional frequency resources are allocated ($\beta>0$), and thus a frequency K allocated for data symbol transmission may be greater than L, corresponding to the number of data symbols to be transmitted within an OFDM symbol. In FIG. 5B, a frequency index i is an integer, which is greater than or equal to 1 and less than or equal to a frequency K allocated for data symbol transmission.

Figure 6A:
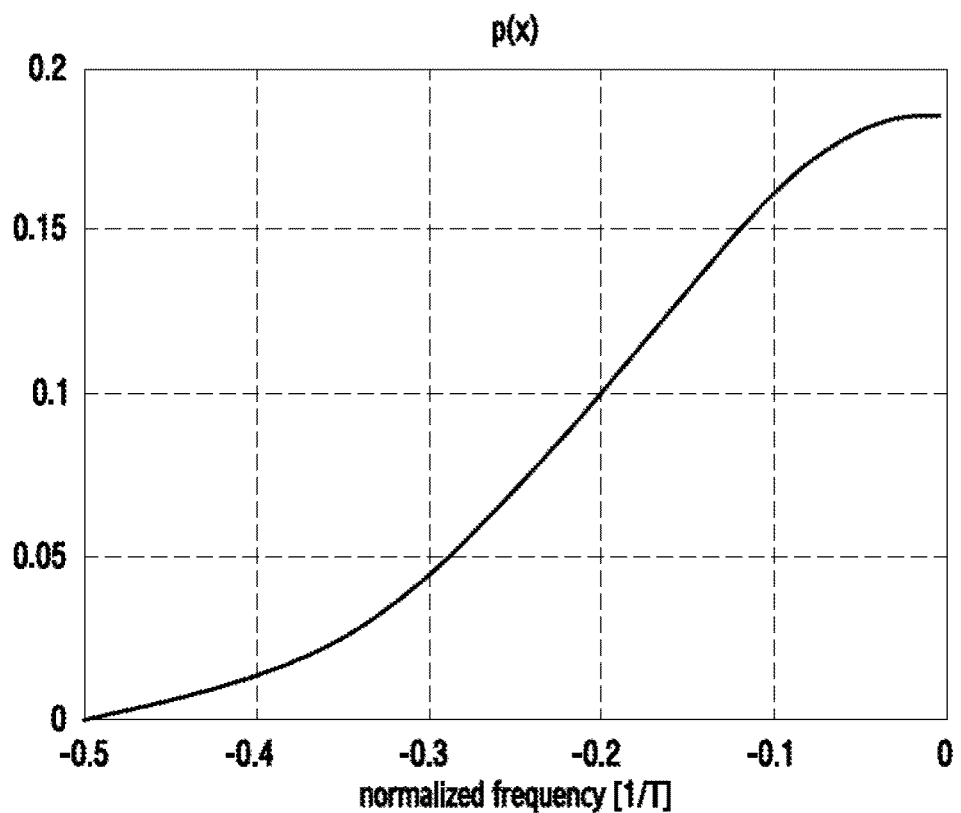
FIG. 6A is a diagram illustrating a polynomial for determining a filter coefficient by a transmitter in a wireless communication system according to various embodiments of the present disclosure.

FIG. 6A is a diagram illustrating a polynomial for determining a filter coefficient by a transmitter in a wireless communication system according to various embodiments of the present disclosure.

Referring to FIG. 6A, the horizontal axis corresponds to a normalized frequency value, and the vertical axis corresponds to a filter coefficient p(x). When additional frequency resources are not allocated, that is, when a frequency K allocated for data symbol transmission is the same as L, corresponding to the number of data symbols to be transmitted within an OFDM symbol (K=L), a filter coefficient $p_i$ may be defined by Equation 5 provided below.

$$p_i^2 = p(x_i), \text{ for } 1 \leq i \leq \frac{L}{2}$$
$$p_i^2 = p_{L-i+1}^2, \text{ for } \frac{L}{2}+1 \leq i \leq L \quad \text{Equation 5}$$

In Equation 5, L corresponds to the number of data symbols to be transmitted within an OFDM symbol, and a polynomial p(x) for determining a filter coefficient may be defined by Equation 6 provided below.

$$p(x)=3.985x^5-5.412x^4-11.24x^3-4.778x^2-0.1347x+0.1849 \quad \text{Equation 6}$$

In Equation 6, the range of x may be $-0.5 \leq x \leq 0$.

Here, p(x) may be a polynomial that satisfies a condition for minimizing the PAPR of a transmission signal and a condition for securing the reception performance of the receiver 120. In addition, p(x) may be a polynomial that approximates, as a continuous function, an optimal filter coefficient that satisfies a condition for minimizing the PAPR of a transmission signal and a condition for securing the reception performance of the receiver 120. More particularly, p(x) may be an optimal function configured to minimize the probability of occurrence of a signal of which the PAPR is greater than or equal to a predetermined value, and to satisfy a predetermined performance condition (e.g., a condition of minimizing a mean square error (MSE)) of a receiver of the receiver 120 (e.g., a widely linear minimum mean square error (WLMMSE) receiver, an MMSE receiver, or a matched filter (MF) receiver) when a predetermined modulation scheme (e.g., BPSK, pulse amplitude modulation (PAM)) is used. In other words, p(x) may be a function determined based on the reception characteristics and the reception performance of the receiver 120.

Although the present disclosure illustrates an example when a polynomial of Equation 6 is used as a polynomial p(x) for determining a coefficient, another polynomial similar to that of Equation 6 may be used. For example, the polynomial for determining a filter coefficient may be any polynomial that satisfies a condition for minimizing the PAPR of a transmission signal and a condition for securing the reception performance of the receiver 120.

For example, a filter coefficient $p_i^2$ of Equation 5 may be defined as a sampling value of the polynomial p(x) of Equation 6, and a sampling index $x_i$ of the polynomial p(x) for determining a filter coefficient of Equation 5 may be defined by Equation 7 provided below.

$$x_i = \left[\frac{-(L-1)}{2L} : \frac{1}{L} : \frac{L-1}{2L}\right]$$ Equation 7

In Equation 7, $x_i$, denotes a sampling index of the polynomial p(x) for determining a filter coefficient. L corresponds to the number of data symbols to be transmitted within an OFDM symbol. For example, the sampling index of the polynomial p(x) may be determined based on L, corresponding to the number of data symbols to be transmitted within an OFDM symbol.

Figure 6B:
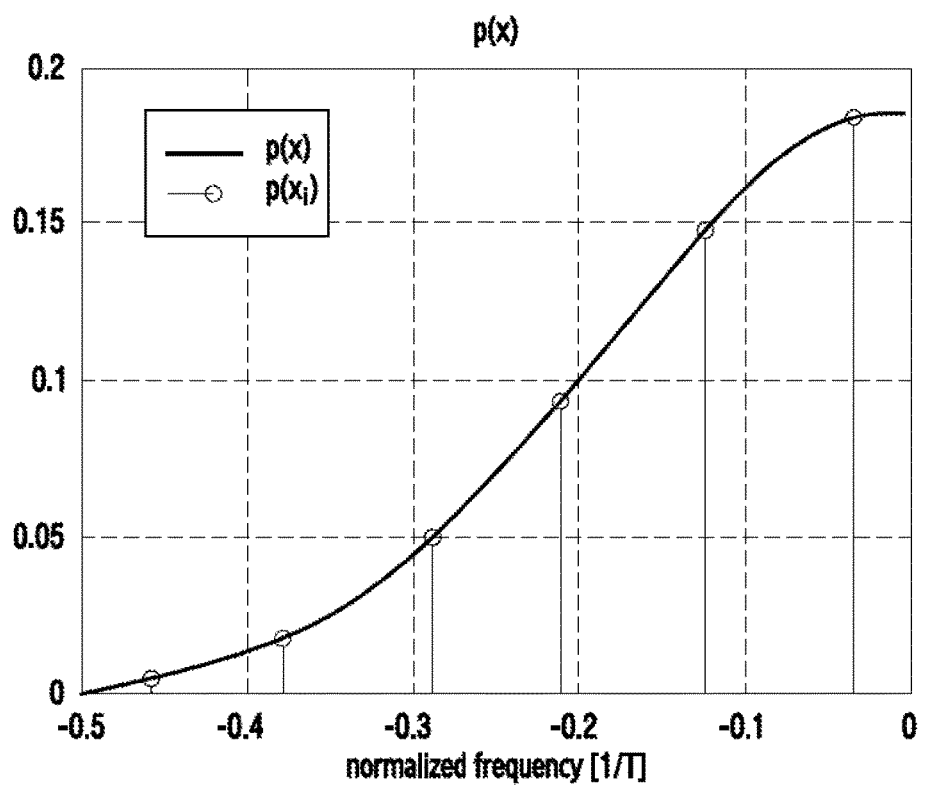
FIG. 6B is a diagram illustrating sampling a filter coefficient when a number of symbols is 12 by a transmitter in a wireless communication system according to various embodiments of the present disclosure.

FIG. 6B is a diagram illustrating sampling a filter coefficient when a number of data symbols is 12 by a transmitter in a wireless communication system according to various embodiments of the present disclosure.

Referring to FIG. 6B, the horizontal axis corresponds to a normalized frequency value, and the vertical axis corresponds to a polynomial p(x) for determining a filter coefficient and the square of a sampled filter coefficient $p_i^2 = p(x_i)$. In FIG. 6B, a continuous solid line corresponds to the polynomial p(x) for determining a filter coefficient, and a discontinuous value obtained by sampling the polynomial p(x) corresponds to the square of the filter coefficient $p_i^2 = p(x_i)$.

The graph of FIG. 6B illustrates an example of the case in which additional frequency resources are not allocated, that is, when a frequency K allocated for data symbol transmission is the same as L, corresponding to the number of data symbols to be transmitted within an OFDM symbol (K=L), and the number of data symbols to be transmitted within an OFDM symbol (L) is 12. For example, K=L=12 and thus the sampling index $x_i$ of the polynomial p(x) for determining a filter coefficient may be defined by Equation 8 provided below.

$$x_i = \left[\frac{-11}{24} : \frac{1}{12} : \frac{11}{24}\right]$$ Equation 8

By sampling the polynomial p(x) for determining a filter coefficient as shown in Equation 8, the filter coefficient may be determined as shown in Equation 9 provided below.

$$p_i^2 = \begin{bmatrix} 0.0057 & 0.0197 & 0.0490 \\ 0.0955 & 0.1476 & 0.1830 \end{bmatrix}$$ Equation 9 for $1 \leq i \leq 6$

In Equation 9, $p_i$ corresponds to a filter coefficient, and i corresponds to a frequency index. FIG. 6B and Equation 9 indicate filter coefficients when the frequency index i ranges from 1 to 6. Filter coefficients for remaining cases, for example, when the frequency index i ranges from 7 to 12, may be set as a graph that is symmetrical to the filter coefficients of FIG. 6B with respect to the y axis.

Figure 6C:
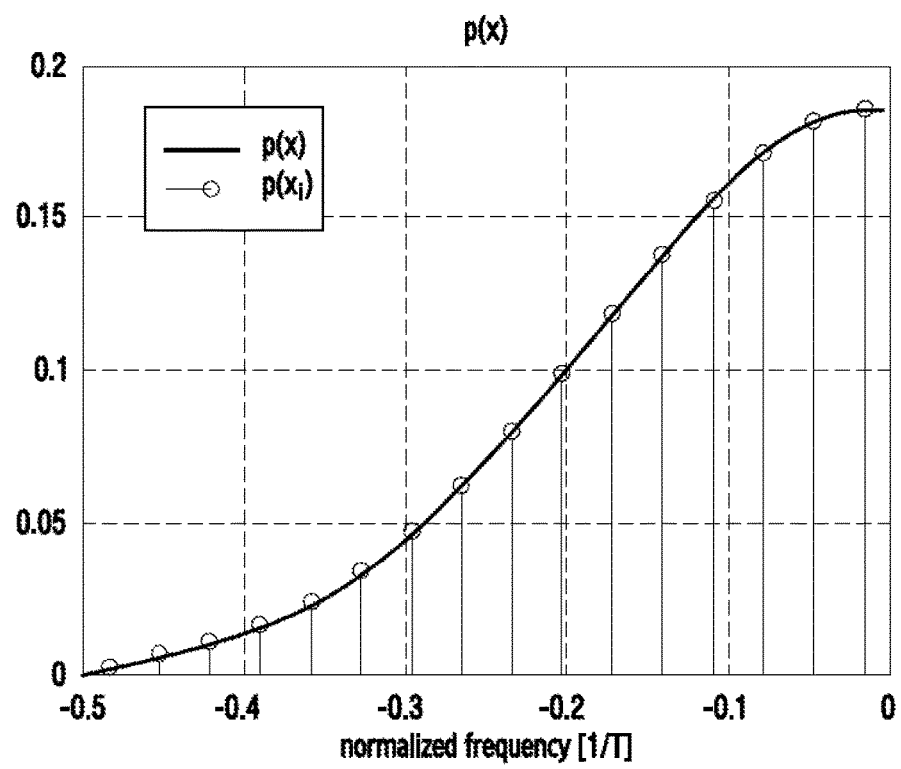
FIG. 6C is a diagram illustrating sampling a filter coefficient when a number of symbols is 32 by a transmitter in a wireless communication system according to various embodiments of the present disclosure.

FIG. 6C is a diagram illustrating sampling a filter coefficient when a number of symbols is 32 by a transmitter of a wireless communication system according to various embodiments of the present disclosure.

Referring to FIG. 6C, the horizontal axis corresponds to a normalized frequency value, and the vertical axis corresponds to a polynomial p(x) for determining a filter coefficient and a sampled filter coefficient $p_i^2 = p(x_i)$. In FIG. 6C, a continuous solid line corresponds to the polynomial p(x) for determining a filter coefficient, and a discontinuous value obtained by sampling the polynomial p(x) corresponds to a filter coefficient $p_i^2 = p(x_i)$.

The graph of FIG. 6D illustrates an example when additional frequency resources are not allocated, that is, when a frequency K allocated for data symbol transmission is the same as L, corresponding to the number of data symbols to be transmitted within an OFDM symbol (K=L), and the number of data symbols to be transmitted within an OFDM symbol (L) is 32. For example, K=L=32, and thus the sampling index $x_i$ of the polynomial p(x) for determining a filter coefficient may be defined by Equation 10 provided below.

$$x_i = \left[\frac{-31}{64} : \frac{1}{32} : \frac{31}{64}\right]$$ Equation 10

By sampling the polynomial p(x) for determining a filter coefficient according to Equation 10, the filter coefficient may be determined by Equation 11 provided below.

$$p_i^2 = \begin{bmatrix} 0.0023 & 0.0064 & 0.0106 & 0.0162 \\ 0.0238 & 0.0339 & 0.0466 & 0.0620 \\ 0.0796 & 0.0987 & 0.1187 & 0.1383 \\ 0.1563 & 0.1714 & 0.1818 & 0.1859 \end{bmatrix}$$ Equation 11 for $1 \leq i \leq 16$

In Equation 11, $p_i$ corresponds to a product of filter coefficients, and i corresponds to a frequency index. FIG. 6C and Equation 11 indicate filter coefficients when the frequency index i ranges from 1 to 16. Filter coefficients for the remaining cases, that is, when the frequency index i ranges from 17 to 32, may be set as a graph that is symmetrical to the filter coefficients of FIG. 6C with respect to the y axis.

Figure 7A:
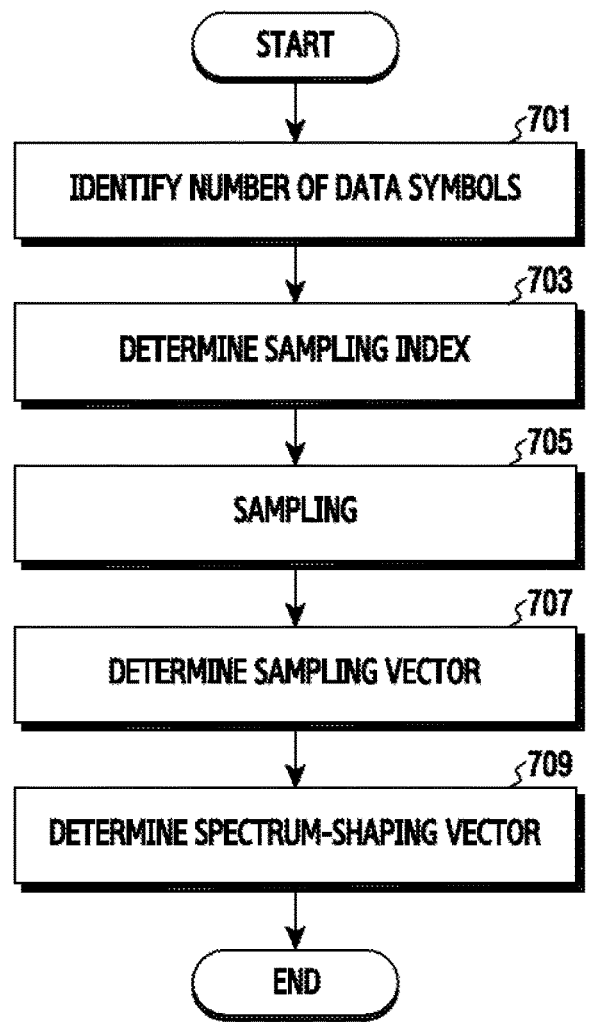
FIG. 7A is a diagram illustrating an operation method of determining a filter coefficient by a transmitter in a wireless communication system according to various embodiments of the present disclosure.

FIG. 7A is a diagram illustrating an operation method of determining a spectrum-shaping vector by a transmitter in a wireless communication system according to various embodiments of the present disclosure. FIG. 7A illustrates an operation method of the transmitter 110 (e.g., a spectrum-shaping block).

Referring to FIG. 7A, in operation 701, the transmitter 110 may determine the number of data symbols to be transmitted within an OFDM symbol. According to various embodiments of the present disclosure, a data symbol transmitted by the transmitter 110 may be a symbol having improper characteristics, such as a BPSK data symbol.

In operation 703, a sampling index may be determined. For example, the transmitter 110 may determine a sampling index of a polynomial for determining a filter coefficient, based on the number of data symbols to be transmitted within an OFDM symbol.

In operation 705, the transmitter may perform sampling. For example, the transmitter may calculate a sampling value by sampling a polynomial for determining a filter coefficient according to the sampling index determined based on the number of data symbols. According to various embodiments of the present disclosure, a polynomial for determining a filter coefficient is symmetrical with respect to the vertical axis and thus, sampling values obtained by sampling the polynomial a number of times corresponding to half the number of data symbols to be transmitted within an OFDM symbol may be determined as coefficients, and coefficients corresponding to the remaining half may be determined as symmetrical values.

In operation 707, the transmitter 110 may determine a vector based on the sampling values. Here, the vector based on the sampling values may be referred to as a 'sampling vector'. For example, the transmitter 110 may determine a vector including the square roots of the sampling values determined in operation 705.

In operation 709, the transmitter 110 may determine a spectrum-shaping vector. For example, the spectrum-shaping vector may be determined by normalizing the vector determined in operation 707.

Figure 7B:
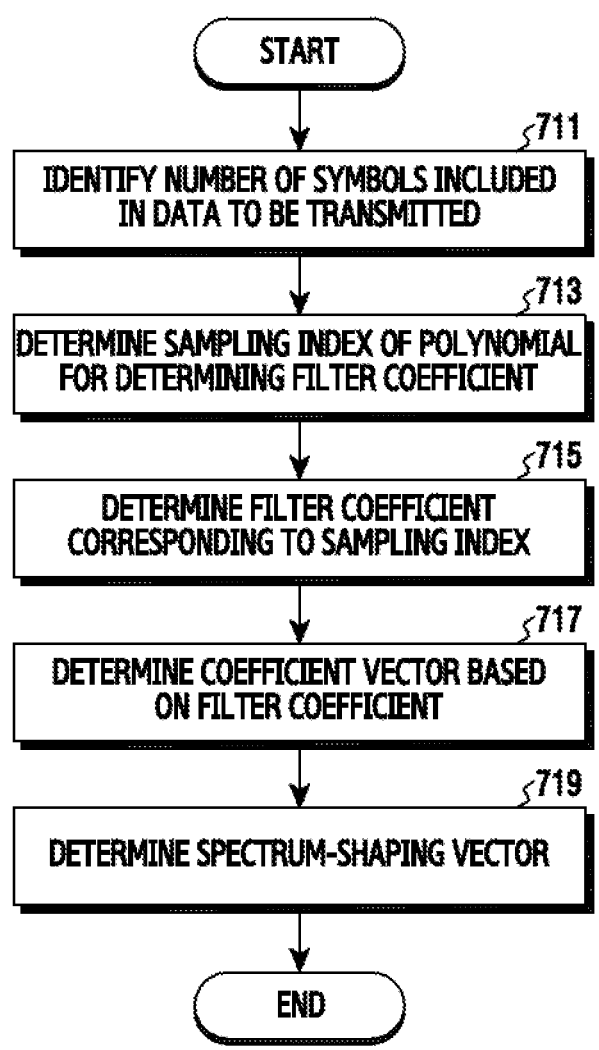
FIG. 7B is a diagram illustrating an operation method of determining a filter coefficient by a transmitter in a wireless communication system according to various embodiments of the present disclosure.

FIG. 7B is a diagram illustrating an operation method of determining a spectrum-shaping vector by a transmitter in a wireless communication system according to various embodiments of the present disclosure. FIG. 7B illustrates an operation method of the transmitter 110 (e.g., a spectrum-shaping block).

Referring to FIG. 7B, in operation 711, the transmitter 110 may determine L corresponding to the number of data symbols to be transmitted within an OFDM symbol.

In operation 713, the transmitter 110 may determine a sampling index $x_i$ of the polynomial $p(x)$ for determining a filter coefficient based on L corresponding to the number of data symbols to be transmitted within an OFDM symbol. For example, the sampling index $x_i$ may be determined by Equation 12 provided below.

$$x_i = \frac{-L-1+2i}{2L}, \text{ for } 1 \leq i \leq \frac{L}{2} \qquad \text{Equation 12}$$

In Equation 12, $x_i$ corresponds to a sampling index of $p(x)$, i corresponds to a frequency index, and L denotes the number of data symbols to be transmitted within an OFDM symbol.

In operation 715, the transmitter may determine a coefficient $|c_i|^2$ corresponding to the sampling index. The transmitter may determine a sampling value $|c_i|^2$. More particularly, the sampling value $|c_i|^2$ may be determined by Equation 13 provided below.

$$|c_i|^2 = p(x_i), \text{ for } 1 \leq i \leq \frac{L}{2} \qquad \text{Equation 13}$$

$$|c_i|^2 = |c_{L-i+1}|^2, \text{ for } \frac{L}{2} \leq i \leq L$$

In Equation 13, $p(x_i)$ corresponds to a sampling value obtained by sampling the polynomial $p(x)$ with respect to $x_i$, i corresponds to a frequency index, and L denotes the number of data symbols to be transmitted within an OFDM symbol. In other words, sampling values are determined by sampling the polynomial $p(x)$ L/2 times, corresponding to half of L, which is the number of data symbols to be transmitted within an OFDM symbol, and coefficients corresponding to the remaining L/2 may be determined as values that are symmetrical with respect to the i=L/2 axis.

In operation 717, the transmitter 110 may determine a sampling vector $\underline{c}$ based on the filter coefficients. More particularly, a sampling vector $\underline{c}$ including the square roots of the L sampling values determined in operation 715 may be determined. The sampling vector $\underline{c}$ may be determined by Equation 14 provided below.

$$\underline{c} = \begin{bmatrix} |c_1| \\ |c_2| \\ \vdots \\ |c_L| \end{bmatrix} \qquad \text{Equation 14}$$

In Equation 14, $\underline{c}$ denotes a sampling vector including the square roots of sampling values. $|c_1|, |c_2| \ldots |c_L|$ denote elements of a vector $\underline{c}$. L corresponds to the number of data symbols to be transmitted within an OFDM symbol.

In operation 719, the transmitter 110 may determine a spectrum-shaping vector $\underline{p}$. More particularly, the spectrum-shaping vector $\underline{p}$ may be determined by normalizing the sampling vector $\underline{c}$ determined in operation 717. For example, the spectrum-shaping vector $\underline{p}$ may be determined by Equation 15 provided below.

$$\underline{p} = \frac{\underline{c}}{\|\underline{c}\|} \qquad \text{Equation 15}$$

In Equation 15, $\underline{c}$ corresponds to a coefficient vector, and $\|\underline{c}\|$ corresponds to the 2-norm value of $\underline{c}$. In other words, the spectrum-shaping vector $\underline{p}$ may be determined based on sampling values obtained by sampling the polynomial $p(x)$ L times, corresponding to the number of data symbols to be transmitted within an OFDM symbol.

Figure 8:
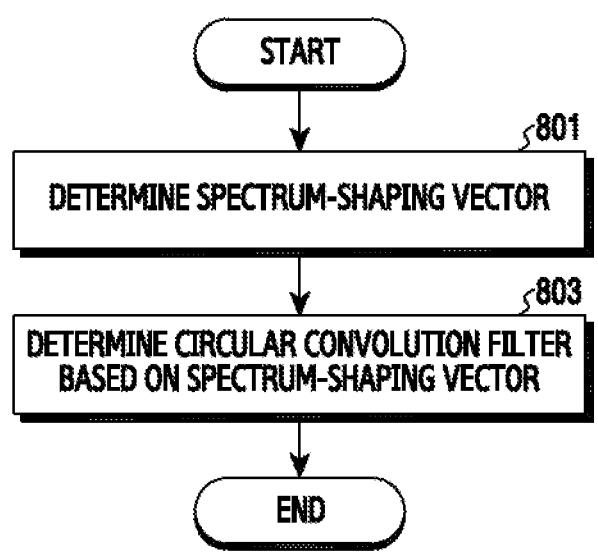
FIG. 8 is a diagram illustrating an operation method of determining a circular convolution filter in a wireless communication system according to various embodiments of the present disclosure.

FIG. 8 is a diagram illustrating an operation method of determining a circular convolution filter in a wireless communication system according to various embodiments of the present disclosure. FIG. 8 illustrates the operation method of the transmitter 110.

Referring to FIG. 8, in operation 801, the transmitter 110 may determine a spectrum-shaping vector. According to some embodiments of the present disclosure, a spectrum-shaping vector may be determined by normalizing the coefficient vector of a filter.

In operation 803, the transmitter 110 may determine a circular convolution filter based on the spectrum-shaping vector. For example, the circular convolution filter may be determined by Equation 16, as provided below. For example, the spectrum-shaping vector may be converted to a circular convolution filter through Equation 16.

$$\tilde{\underline{d}}[m] \odot \underline{p} = \text{diag}\{p_1, p_2, \ldots, p_L\}\tilde{\underline{d}}[m] \qquad \text{Equation 16}$$

$$= \text{diag}\{p_1, p_2, \ldots, p_L\}W_L\underline{d}[m]$$

$$= W_L W_L^H \text{diag}\{p_1, p_2, \ldots, p_L\}W_L\underline{d}[m]$$

$$= W_L \tilde{P}\underline{d}[m]$$

Equation 16 may be derived from Equation 3. In this instance, $\tilde{P}$ which is Fourier conversion of a diag$\{p_1, p_2, \ldots, p_L\}$ matrix, is always a circulant matrix, and may be in the form of Equation 17. For example, the circulant matrix may be determined based on L, which is the number of data symbols.

$$\tilde{P} = \begin{bmatrix} \tilde{p}_1 & \tilde{p}_L & \cdots & \tilde{p}_3 & \tilde{p}_2 \\ \tilde{p}_2 & \tilde{p}_1 & \tilde{p}_L & & \tilde{p}_3 \\ \vdots & \tilde{p}_2 & \tilde{p}_1 & \ddots & \vdots \\ \tilde{p}_{L-1} & & \ddots & \ddots & \tilde{p}_L \\ \tilde{p}_L & \tilde{p}_{L-1} & \cdots & \tilde{p}_2 & \tilde{p}_1 \end{bmatrix}$$

Equation 17

Therefore, the $\tilde{P}\underline{d}[m]|$ part of Equation 16 may be regarded as an operation of performing circular convolution of a data sequence vector $\underline{d}[m]$ using $\tilde{P}$.

Therefore, a circular convolution filter $\underline{\tilde{p}} \triangleq [\tilde{p}_1 \ \tilde{p}_2 \ \ldots \ \tilde{p}_L]^T$ may be considered for a low PAPR, instead of a spectrum-shaping vector. When a filter tap is defined as the number of nonzero convolution filter coefficients, the values provided below may be applied to each filter tap, whereby a PAPR may be reduced. A PAPR value may be inversely proportional to the number of taps. According to some embodiments of the present disclosure, a filter tap may be determined based on information associated with the reception performance and power of the receiver 120. For example, information associated with power may indicate a PAPR value. According to other embodiments of the present disclosure, the best performance may be shown when an L-tap convolutional filter is used. Here, the L-tap convolutional filter may be a circular convolution filter including L non-zero convolution filter coefficients. In this instance, unlike the above-described polynomial scheme, extension is allowed by padding 0 to circular convolution filter coefficients according to an L value, without a process of specially obtaining a filter from a function. For example, when the circulant matrix of Equation 17 is an L×L matrix, extension is allowed by padding L-K 0 to circular convolution filter coefficients of a K-tap convolution filter, K being smaller than L.

For example, a 3-tap circular convolution filter may be expressed as Equation 18 provided below.

$$\underline{\tilde{p}} \triangleq [\tilde{p}_1 \tilde{p}_2 \tilde{p}_3 0 \ldots 0]^T$$

Equation 18

As another example, a 4-tap circular convolution filter may be expressed as Equation 19 provided below.

$$\underline{\tilde{p}} \triangleq [\tilde{p}_1 \tilde{p}_2 \tilde{p}_3 \tilde{p}_4 0 \ldots 0]^T$$

Equation 19

As another example, a K-tap circular convolution filter may be expressed as Equation 20 provided below.

$$\underline{\tilde{p}} \triangleq [\tilde{p}_1 \tilde{p}_2 \ldots \tilde{p}_K 0 \ldots 0]^T$$

Equation 20

When K<L, a circular convolution filter may be generated with respect to a random K value, as shown above. The value of a circular convolution filter that reduces a PAPR is listed for each tap up to a 7-tap circular convolution filter. For example, a filter value may not be unique, and may be determined using a value obtained by circularly shifting the value below in Table 1.

TABLE 1

| | $\tilde{p}_1$ | $\tilde{p}_2$ | $\tilde{p}_3$ | $\tilde{p}_4$ | $\tilde{p}_5$ | $\tilde{p}_6$ | $\tilde{p}_7$ |
|---|---|---|---|---|---|---|---|
| 3tap | −0.6972 | 0.7167 | −0.0161 | 0 | 0 | 0 | 0 |
| 4tap | −0.1185 | −0.35 | 0.8699 | −0.3267 | 0 | 0 | 0 |
| 5tap | −0.0608 | −0.3413 | 0.8714 | −0.3417 | −0.0613 | 0 | 0 |
| 6tap | −0.0688 | −0.347 | 0.8765 | −0.3225 | −0.0512 | −0.0074 | 0 |
| 7tap | −0.0651 | −0.3409 | 0.8793 | −0.3218 | −0.0527 | −0.0073 | −0.0034 |

An equivalent spectrum-shaping vector may be obtained using the values.

According to an embodiment of the present disclosure, information associated with Table 1 may be stored in the transmitter 110. In some embodiments of the present disclosure, the transmitter 110 may determine a circular convolution filter by adaptively selecting one of the 3tap, 4tap, 5tap, 6tap, and 7tap of Table 1 in order to reduce a PAPR.

In some other embodiments of the present disclosure, one circular convolution filter for a predetermined filter tap determined according to a PAPR value and a reception performance required by a system may be stored in the transmitter 110 and the receiver 120. For example, the circular convolution filter for a predetermined filter tap, which is determined by the system, may be shared by the transmitter 110 and the receiver 120, and may be utilized.

Figure 9:
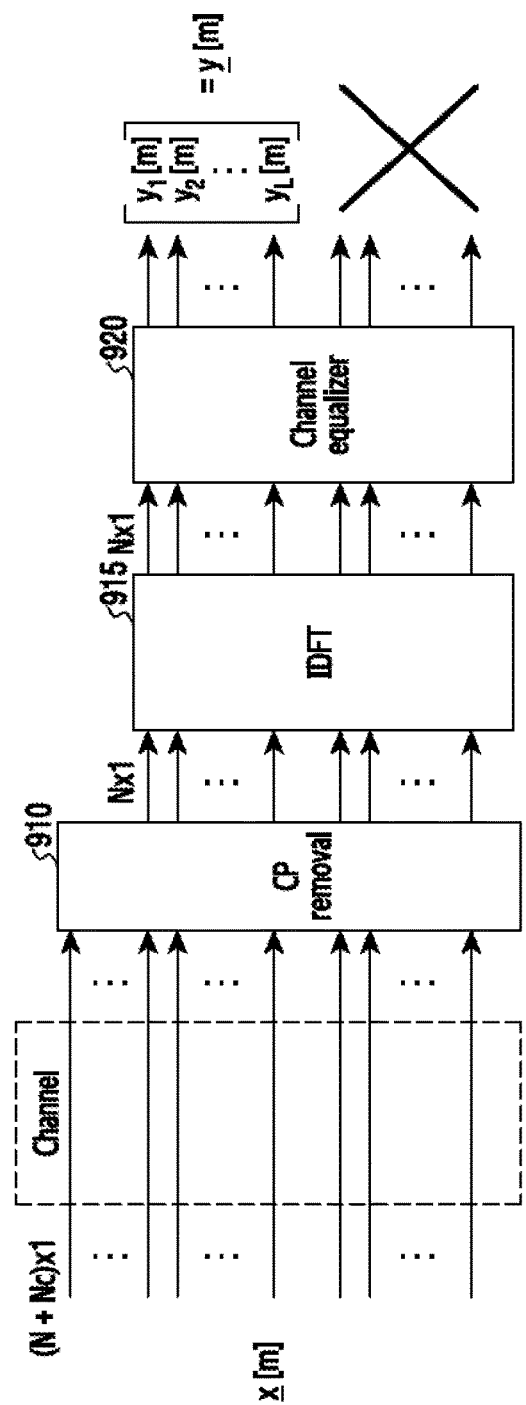
FIG. 9 is a diagram illustrating a configuration of a communication unit of a receiver in a wireless communication system according to various embodiments of the present disclosure.

FIG. 9 is a diagram illustrating a configuration of a communication unit of a receiver in a wireless communication system according to various embodiments of the present disclosure. The configuration of FIG. 9 may be construed as part of the configuration of the communication unit 220.

Referring to FIG. 9, the communication unit of the receiver 120 may include a CP removal block 910, an IDFT block 915, and a channel equalizer 920.

A signal $\underline{x}[m]$ transmitted from the transmitter 110 may be received by the receiver 120 through a channel. A vector $\underline{x}[m]$ of the received signal may include $N_C$ CPs in addition to N data symbols.

The CP removal block 910 may remove the CPs from the vector $\underline{x}[m]$ of the received signal. For example, the CP removal block 910 may remove the data of the symbols occupied by the CPs in the received signal. In other words, the CP removal block 910 may remove $N_C$ CPs from the vector $\underline{x}[m]$ of the received signal including (N+$N_C$) entries. For example, the CP removal block 910 may receive an input of the vector $\underline{x}[m]$ of the received signal including (N+$N_C$) entries, and may output a time-domain symbol vector including N entries to the IDFT block 915.

The IDFT block 915 may convert time-domain data provided from the CP removal block 910 into frequency-domain data. For example, the IDFT block 915 may apply an IDFT matrix to a vector including N data symbols, thereby generating frequency-domain data which are mapped to N subcarriers. The vector converted by the IDFT block 915 may be output to the channel equalizer 920.

The channel equalizer 920 may perform equalization of the converted frequency-domain data. For example, the channel equalizer 920 may compensate for distortion of data caused by a channel. In addition, the channel equalizer 920 may extract L pieces of data from among N subcarriers. In other words, the channel equalizer 920 may output a vector $\underline{y}[m]$ including data allocated to L subcarriers.

Figure 10:
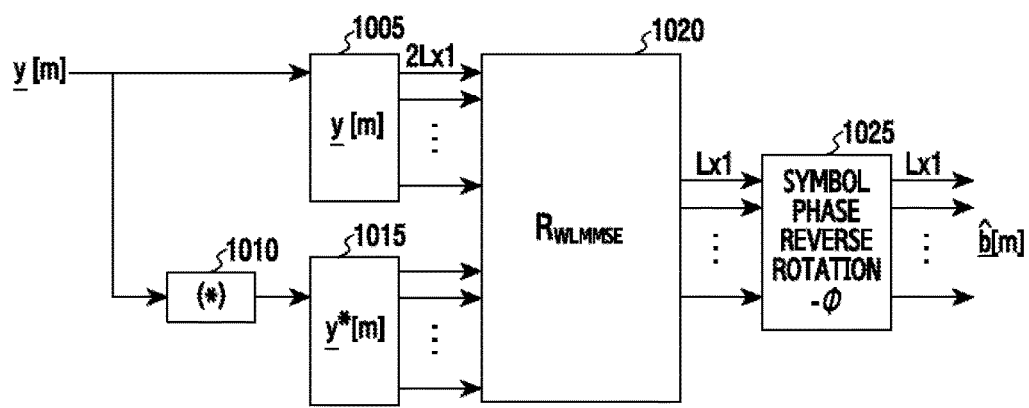
FIG. 10 is a diagram illustrating a configuration of a communication unit of a receiver in a wireless communication system according to various embodiments of the present disclosure.

FIG. 10 is a diagram illustrating a configuration of a communication unit of a receiver in a wireless communication system according to various embodiments of the present disclosure. The configuration of FIG. 10 may be construed as a part of the configuration of the communication unit 220. The configuration of FIG. 10 may be connected with the configuration of FIG. 9. For example, the channel equalizer 920 of FIG. 9 may be connected with a conjugation block 1010 and a WLMMSE block 1020 of FIG. 10.

Referring to FIG. 10, the receiver 120 of FIG. 10 may include the conjugation block 1010 (*), the WLMMSE block 1020, and a phase reverse rotation block 1025.

The conjugation block 1010 generates conjugation values for the values of a vector $\underline{y}[m]$ 1005 input by a channel equalizer (e.g., the channel equalizer of FIG. 9), and may output a vector $\underline{y}^*[m]$ 1015 of the generated conjugation vales to the WLMMSE block 1020.

The WLMMSE block 1020 may apply a WLMMSE matrix to the vector y[m] 1005 input by the channel equalizer 920 of FIG. 9 and the vector y*[m] 1015 input by the conjugation block 1010, thereby compensating for the distortion of data caused by spectrum shaping performed by the transmitter 110. The operation of the WLMMSE block will be described below with reference to FIG. 11A provided below.

Figure 11A:
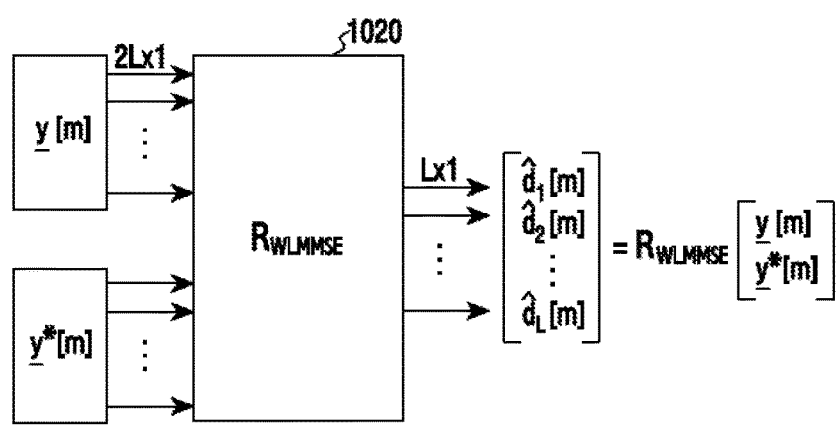
FIG. 11A is a diagram illustrating a process of applying a widely linear minimum mean square error (WLMMSE) matrix by a receiver in a wireless communication system according to various embodiments of the present disclosure.

FIG. 11A is a diagram illustrating a process of applying a WLMMSE matrix by a receiver in a wireless communication system according to various embodiments of the present disclosure. FIG. 11A illustrates an example of an operation of the WLMMSE block 1020 of FIG. 10.

Referring to FIG. 11A, a vector in a size of 2L×1, which includes a vector y[m] provided from a channel equalizer (e.g., the channel equalizer of FIG. 9) and y*[m] generated by a conjugation block (e.g., the conjugation block 1010 of FIG. 10) as sub vectors, may be input to the WLMMSE block 1020. The WLMMSE block 1020 may apply a WLMMSE matrix to the input vector, and may output a vector in a size of L×1. The WLMMSE block 1020 of FIG. 11A may be in a configuration which is the same as or similar to the configuration of the WLMMSE block 1020 of FIG. 10.

According to various embodiments of the present disclosure, a WLMMSE matrix may be defined by Equation 21 provided below.

$$R_{WLMMSE} = \qquad \text{Equation 21}$$
$$[S^H \quad E(\phi)S^T] \begin{bmatrix} SS^H + R_{NN} & SE(\phi)S^T + \tilde{R}_{NN} \\ (SE(\phi)S^T + \tilde{R}_{NN})^* & (SS^H + R_{NN})^* \end{bmatrix}^{-1}$$

In Equation 21, S is a circular filter matrix used by the transmitter 110, and may be defined by Equation 22 provided below. E($\phi$) may be defined by Equation 23 provided below. In addition, $\tilde{S}$ in Equation 21 may be defined by Equation 24 provided below. In addition, in Equation 21, $R_{NN}$ corresponds to a noise covariance matrix, and $\tilde{R}_{NN}$ corresponds to a noise pseudo covariance matrix.

$$S \triangleq \text{diag}\{\underline{p}\} W_L \qquad \text{Equation 22}$$

In Equation 22, p corresponds to a spectrum-shaping vector. $W_L$ corresponds to an L-point DFT matrix. L corresponds to the number of data symbols to be transmitted within an OFDM symbol.

$$\text{Equation 23}$$
$$E\{\underline{d}[m]\underline{d}[m]^T\} = E\{\underline{b}[m]\underline{b}[m]^T\} \odot \begin{bmatrix} e^{j\phi \cdot 0} & e^{j\phi \cdot 1} & \cdots & e^{j\phi \cdot (L-1)} \\ e^{j\phi \cdot 1} & e^{j\phi \cdot 2} & \cdots & e^{j\phi \cdot L} \\ \vdots & \vdots & \ddots & \vdots \\ e^{j\phi \cdot (L-1)} & e^{j\phi \cdot L} & \cdots & e^{j\phi \cdot (2L-2)} \end{bmatrix}$$
$$= \text{diag}\{e^{j\phi \cdot 0}, e^{j\phi \cdot 2}, e^{j\phi \cdot 4}, \ldots, e^{j\phi \cdot (2L-2)}\}$$
$$= E(\phi)$$

In Equation 23, b[m] denotes a BPSK data symbol vector. d[m] denotes a data symbol vector, the phase of which is rotated. L denotes the number of data symbols to be transmitted within an OFDM symbol. $\phi$ denotes the amount of phase rotation. In Equation 23, when a data symbol has improper characteristics, $E\{\underline{b}[m]\underline{b}[m]^T\}$ may be configured as a nonzero matrix.

$$\tilde{S} \triangleq W_S^H \begin{bmatrix} S \\ 0_{(N-K) \times L} \end{bmatrix} \qquad \text{Equation 24}$$

In Equation 24, S denotes a circular filter matrix used by the transmitter 110. $W_N^H$ denotes an N-point IDFT matrix. N denotes the size of an OFDM IDFT. K denotes the number of subcarriers allocated to the receiver 120. L denotes the number of data symbols to be transmitted within an OFDM symbol.

According to various embodiments of the present disclosure, the receiver 120 performs sampling a function p(x) according to K, corresponding to the number of subcarriers allocated to the receiver 120, and may determine a WLMMSE matrix using a filter matrix S including filter coefficients determined by the sampling. In other words, the WLMMSE matrix may be determined based on the filter matrix S of the transmitter, which satisfies a condition for reducing the PAPR of a transmission signal and a condition for satisfying the reception performance of the receiver 120.

Figure 11B:
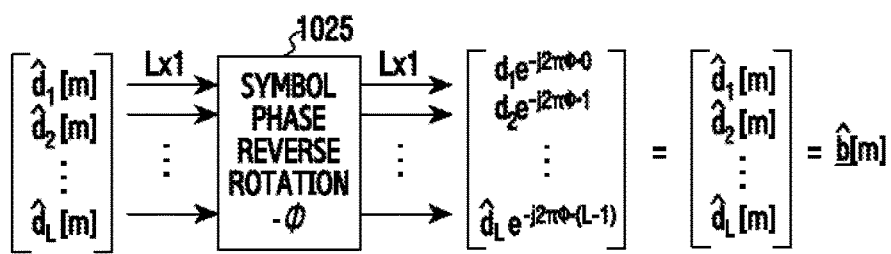
FIG. 11B is a diagram illustrating a process of applying symbol phase reverse rotation by a receiver in a wireless communication system according to various embodiments of the present disclosure.

FIG. 11B is a diagram illustrating a process of applying a symbol phase reverse rotation by a receiver in a wireless communication system according to various embodiments of the present disclosure. FIG. 11B illustrates an example of an operation of the phase reverse rotation block 1025 of FIG. 10.

Referring to FIG. 11B, a vector in a size of L×1, which is output from a WLMMSE block (e.g., the WLMMSE block 1020 of FIG. 11A) may be input to the symbol phase reverse rotation block 1025. The symbol phase reverse rotation block 1025 may change the phase of data of the input vector. More particularly, the symbol phase reverse rotation block 1025 may apply a phase reverse rotation vector to the vector provided by the WLMMSE block, thereby restoring an OFDM data symbol b[m]. According to various embodiments of the present disclosure, the receiver 120 may change the phase of a vector output by the WLMMSE block, based on a phase reverse rotation value –$\phi$ determined based on L, which is the number of subcarriers allocated to the receiver 120.

Figure 12:
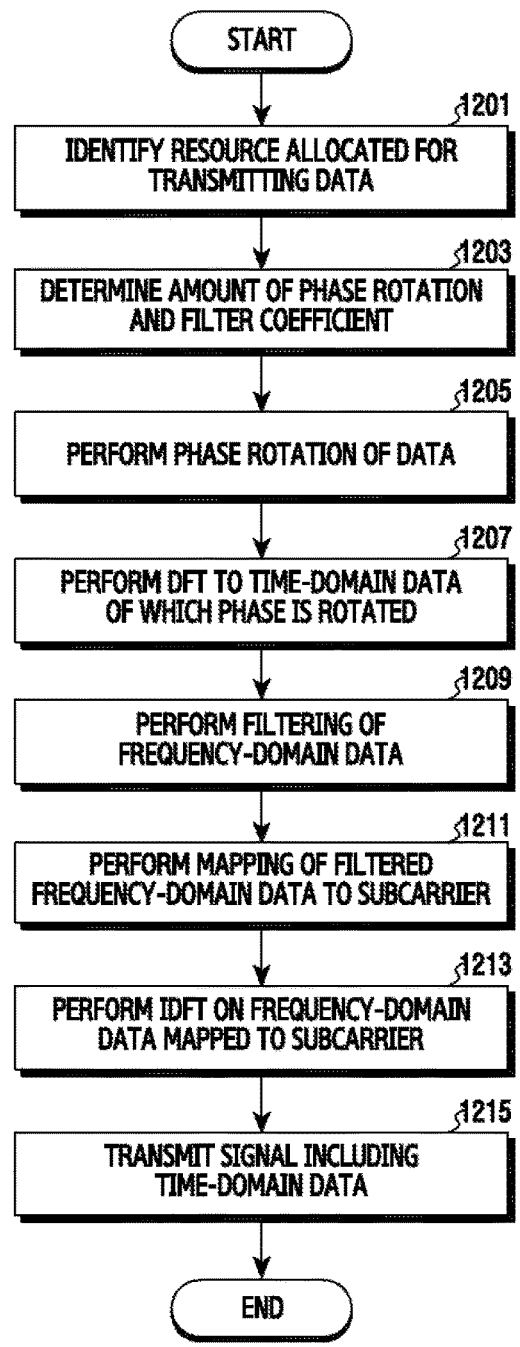
FIG. 12 is a diagram illustrating an operation method of reducing a peak-to-average power ratio (PAPR) by a transmitter in a wireless communication system according to various embodiments of the present disclosure.

FIG. 12 is a diagram illustrating an operation method of reducing a PAPR by a transmitter in a wireless communication system according to various embodiments of the present disclosure. FIGS. 11A and 11B illustrate the operation method of the transmitter 110.

Referring to FIG. 12, in operation 1201, the transmitter 110 may determine a resource allocated for transmitting data to the receiver 120. For example, the transmitter 110, corresponding to a terminal in an uplink, may identify a predetermined number of frequency resources (the number of subcarriers) allocated for transmitting one OFDM symbol to the receiver 120. As another example, the transmitter 110, corresponding to a base station in a downlink, may allocate frequency resources, which are allocated for transmitting data to the receiver 120, corresponding to a terminal.

According to various embodiments of the present disclosure, the transmitter 110 may allocate frequency resources, the number of which is the same as the number of symbols of transmission data, without allocating additional frequency resources. When additional frequency resources are not allocated, the transmitter 110 according to various embodiments of the present disclosure may convert, to a PAPR gain, the gain of the reception performance of the receiver 120, which is obtained by applying a widely linear receiver that uses a BPSK symbol having improper characteristics.

According to various embodiments of the present disclosure, the transmitter 110 may allocate a larger number of frequency resources than the number of transmission data symbols. For example, the transmitter 110 may allocate additional frequency resources. By allocating additional frequency resources, the transmitter 110 may convert a frequency resource gain to an additional gain for reducing a PAPR.

In operation 1203, the transmitter 110 may identify the amount of phase rotation and a filter coefficient. According to various embodiments of the present disclosure, the amount of phase rotation and the filter coefficient may be determined based on the number of frequency resources allocated for transmitting one OFDM symbol to a receiver. In addition, the filter coefficient may be set to satisfy a condition for minimizing the PAPR of a transmission signal of the transmitter 110 and a condition for satisfying the reception performance of the receiver 120. For example, a value obtained by sampling a polynomial, which is configured to satisfy the condition for reducing the PAPR and the condition for satisfying the reception performance of the receiver 120, according to allocated frequency resources, may be determined as a filter coefficient.

In operation 1205, the transmitter 110 may perform phase rotation of data. For example, the transmitter 110 may change the phase of data according to the amount of phase rotation, determined based on the amount of frequency resources allocated for data to be transmitted. By changing the phase of the data, an interpolation interference probability of data in the time domain may be reduced, whereby a PAPR may be reduced.

In operation 1207, the transmitter 110 may perform DFT with respect to time-domain data, the phase of which is rotated. For example, the transmitter 110 may apply a DFT matrix to the time-domain data of which the phase is rotated, thereby converting the time-domain data to frequency-domain data.

In operation 1209, the transmitter 110 may perform filtering of the frequency-domain data. For example, the transmitter 110 may apply, to the frequency-domain data, a filter matrix including the filter coefficient determined in operation 1203. When additional frequency resources are not allocated, the size of the filter matrix (the number of rows and the number of columns) may be set to be the same as the number of transmission data symbols. When additional frequency resources are allocated, the number of rows of the filter matrix may be set to be greater than the number of columns. Accordingly, the size of a vector to which the filter matrix is applied may be greater than the number of data symbols.

According to various embodiments of the present disclosure, operations 1207 and 1209 may be performed though a single operation. In other words, the filter matrix in operation 1209 may be a matrix including a product of the filter coefficient and a value for conversion to the frequency domain.

In operation 1211, the transmitter 110 may map the filtered frequency-domain data to subcarriers.

In operation 1213, the transmitter 110 may perform IDFT with respect to the frequency-domain data mapped to the subcarriers. For example, the transmitter 110 may apply an IDFT matrix to the frequency-domain data mapped to the subcarriers, thereby converting the frequency-domain data to time-domain data.

In operation 1215, the transmitter 110 may transmit a signal including the time-domain data. For example, the transmitter 110 may transmit a signal obtained by up-converting the time-domain data to the receiver 120 through an antenna. Since phase changing and filtering has been applied to the time-domain data, the up-converted signal may have a low PAPR.

Figure 13:
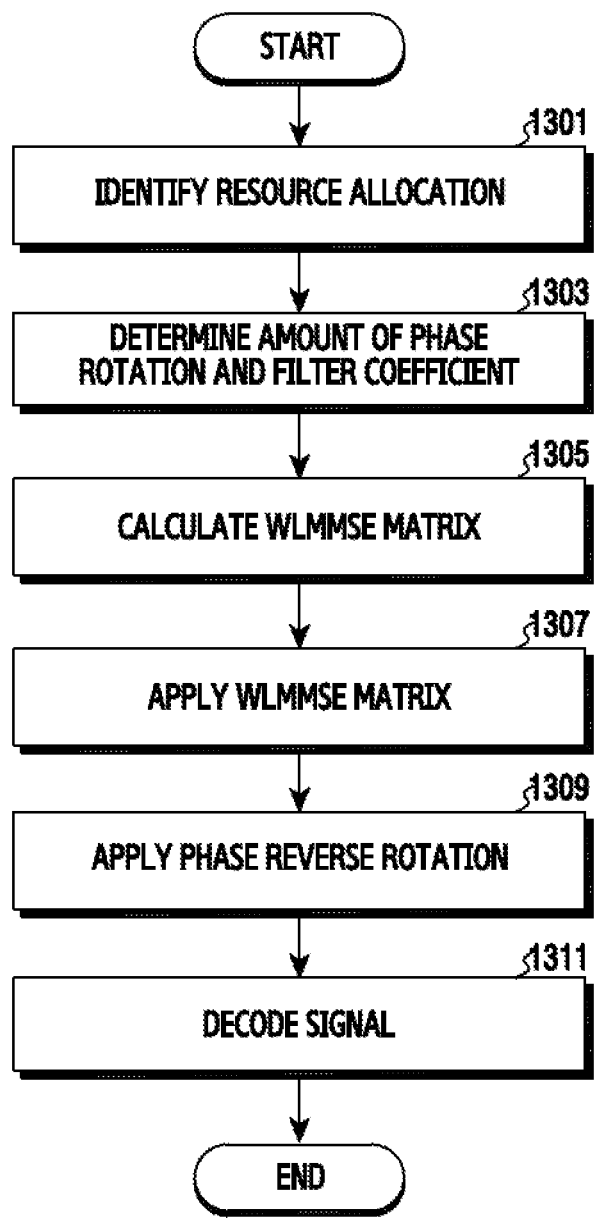
FIG. 13 is a diagram illustrating an operation method of reducing a PAPR by a receiver in a wireless communication system according to various embodiments of the present disclosure.

FIG. 13 is a diagram illustrating an operation method of reducing a PAPR by a receiver in a wireless communication system according to various embodiments of the present disclosure. FIG. 13 illustrates the operation method of the receiver 120.

Referring to FIG. 13, in operation 1301, the receiver 120 identifies allocated resources. For example, when the receiver 120 is a base station, the receiver 120 may identify the number of frequency resources (e.g., subcarriers) in order to receive an uplink signal from the transmitter 110, corresponding to a terminal. As another example, when the receiver 120 is a terminal, the receiver 120 may identify the number of frequency resources (subcarriers) allocated to the receiver 120 based on control information received from the transmitter 110 through a control channel.

In operation 1303, the receiver 120 may identify the amount of phase rotation and a filter coefficient. According to various embodiments of the present disclosure, the amount of phase rotation or the filter coefficient may be determined based on the number of allocated frequency resources and the number of data symbols. The number of allocated frequency resources may be identified through a control signal in operation 1201. According to various embodiments of the present disclosure, the number of data symbols may be the same as the number of allocated frequency resources. For example, additional frequency resources for data symbol transmission may not be allocated. According to other embodiments of the present disclosure, the number of data symbols may be less than the number of allocated frequency resources. For example, additional frequency resources may be allocated, the number of which is greater than the number of data symbols. In this instance, the receiver 120 may identify the number of data symbols through a control signal transmitted through the control channel. In addition, the receiver 120 may identify the number of data symbols according to a channel state with the transmitter 110. For example, the receiver 120 may index the number of data symbols to a modulation and coding scheme (MCS) level. The receiver 120 may identify the amount of phase rotation based on the number of allocated frequency resources and the number of data symbols. In addition, the receiver 120 may identify the filter coefficient based on the number of allocated frequency resources and the number of data symbols. According to various embodiments of the present disclosure, the amount of phase rotation or the filter coefficient may be defined in advance based on the number of allocated frequency resources and the number of data symbols. For example, the amount of phase rotation or the filter coefficient may be listed in a table according to the number of allocated frequency resources and the number of data symbols, and may be stored in advance in the transmitter 110 or the receiver 120, or may be shared through a control channel between the transmitter 110 and the receiver 120. In addition, the amount of phase rotation or the filter coefficient may be set by being indexed to the MCS level.

In operation 1305, the receiver 120 may calculate a WLMMSE matrix. The WLMMSE matrix according to various embodiments of the present disclosure may be set to satisfy a condition for minimizing the PAPR of a transmission signal and a condition for optimizing the reception performance of a reception signal (a condition for minimizing the MSE of a reception signal). The WLMMSE matrix may be determined based on the filter coefficient identified in operation 1201. More particularly, the WLMMSE matrix may be configured based on a filter matrix including the filter coefficient determined by taking into consideration the receiver characteristics and reception performance of the receiver.

In operation 1307, the receiver 120 may apply the WLMMSE matrix to received data. The receiver 120 may apply the WLMMSE matrix to frequency-domain data converted from the data of the received signal. In association with the converted frequency-domain data, distortion attributable to a channel may be compensated for through a channel equalizer, or some data may be extracted according to the number of data symbols before the WLMMSE matrix is applied. The receiver 120 may apply the WLMMSE matrix to L pieces of data passing through the channel equalizer. As the WLMMSE matrix is applied, data of which signal distortion attributable to filtering by the transmitter 110 is compensated for may be output. More particularly, the WLMMSE matrix may use a BPSK symbol having improper characteristics.

In operation 1309, the receiver 120 may apply phase reverse rotation. For example, the receiver 120 may reversely rotate the phase of data by the amount of phase rotation identified in operation 1303. By performing phase reverse rotation, the phase rotation performed by the transmitter 110 may be compensated for.

In operation 1311, the receiver 120 may demodulate the signal. For example, the receiver 120 may decode the received data, and may transmit an acknowledgement (ACK) or a negative ACK (NACK) signal to the transmitter 110.

Figure 14:
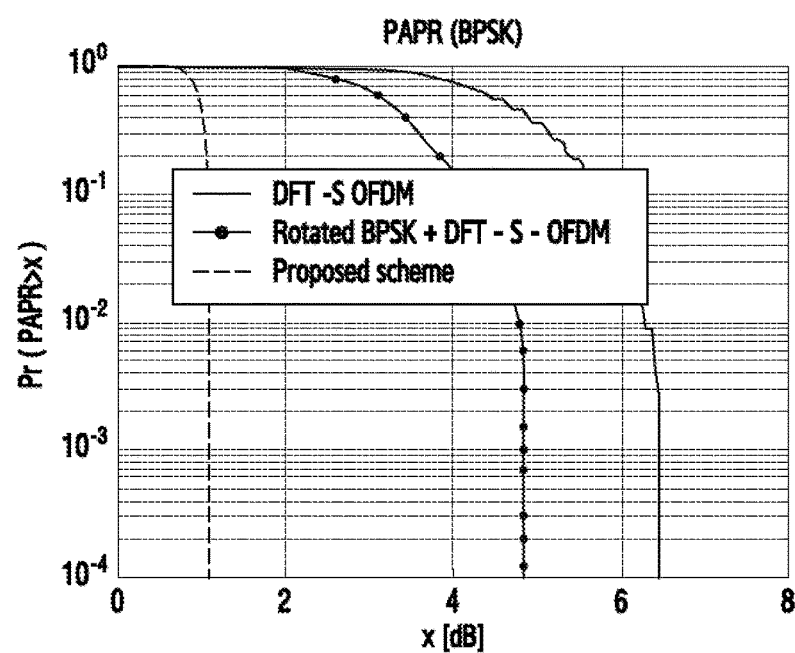
FIG. 14 is a diagram illustrating PAPR performance when additional frequency resources are not allocated in a wireless communication system according to various embodiments of the present disclosure.

FIG. 14 is a diagram illustrating PAPR performance when additional frequency resources are not allocated in a wireless communication system according to various embodiments of the present disclosure.

Referring to FIG. 14, the horizontal axis indicates the PAPR of a signal, and the vertical axis indicates the probability of occurrence of a PAPR greater than a predetermined value. The graph of FIG. 14 shows a simulation result when L, corresponding to the number of BPSK data symbols, is 12 (L=12), K, corresponding to the number of allocated frequency resources, is 12 (K=12), and the size of an OFDM IDFT is 128 (N=128). Referring to FIG. 14, when the probability of occurrence of a PAPR greater than a predetermined value is $10^{-3}$, it is identified that a PAPR in the case in which a PAPR reduction scheme according to various embodiments of the present disclosure is applied may have a PAPR gain of 3.75 dB, unlike the case in which a phase rotation scheme is applied to DFT-S-OFDM.

Figure 15:
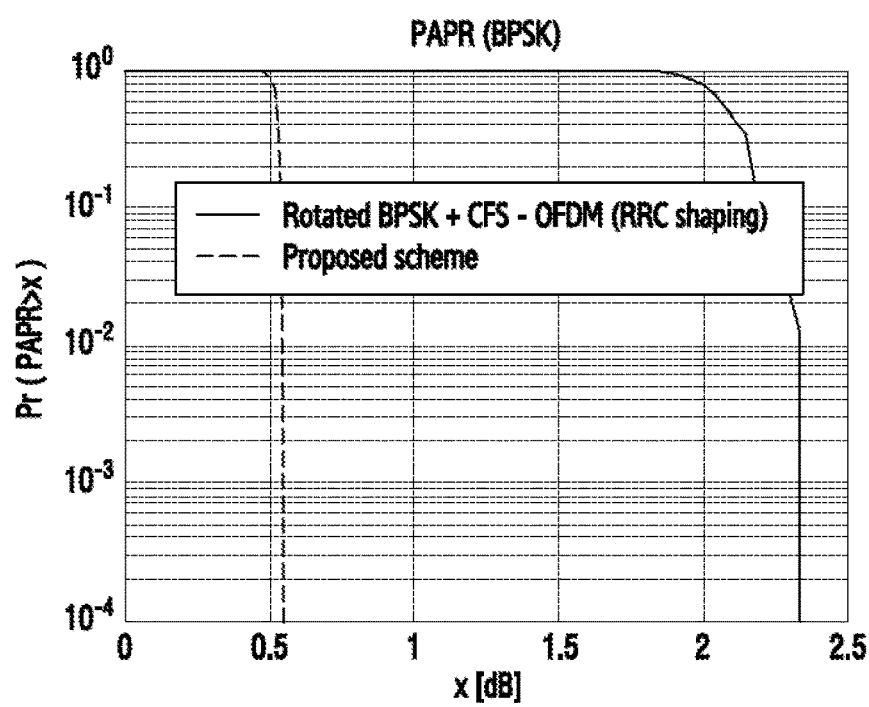
FIG. 15 is a diagram illustrating PAPR performance when additional frequency resources are allocated in a wireless communication system according to various embodiments of the present disclosure.

FIG. 15 is a diagram illustrating PAPR performance when additional frequency resources are allocated in a wireless communication system according to various embodiments of the present disclosure.

Referring to FIG. 15, the horizontal axis indicates the PAPR of a signal, and the vertical axis indicates the probability of occurrence of a PAPR greater than a predetermined value. The graph of FIG. 15 shows a simulation result when L, corresponding to the number of BPSK data symbols, is 12 (L=12), K, corresponding to the number of allocated frequency resources, is 16 (K=16), and the size of an OFDM IDFT is 128 (N=128). Referring to FIG. 15, when the probability of occurrence of a PAPR greater than a predetermined value is $10^{-3}$, it is identified that a PAPR in the case in which a PAPR reduction scheme according to various embodiments of the present disclosure is applied may have a PAPR gain of 1.8 dB when compared to the case in which a phase rotation scheme (root-raised-cosine (RRC) shaping) is applied to DFT-S-OFDM.

Figure 16:
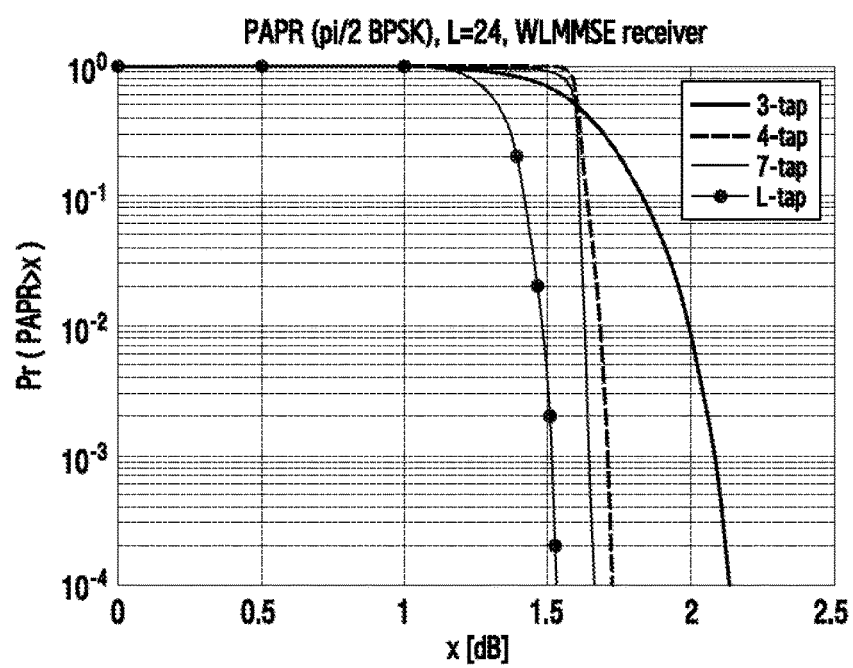
FIG. 16 is a diagram illustrating a PAPR performance when a circular convolution filter is used in a wireless communication system according to various embodiments of the present disclosure.

FIG. 16 is a diagram illustrating PAPR performance when a circular convolution filter is used in a wireless communication system according to various embodiments of the present disclosure.

Referring to FIG. 16, the horizontal axis indicates the PAPR of a signal, and the vertical axis indicates the probability of occurrence of a PAPR greater than a predetermined value. The graph of FIG. 16 shows simulation results for a 3-tap circular convolution filter, a 4-tap circular convolution filter, a 7-tap circular convolution filter, and an L-tap circular convolution filter. Referring to FIG. 16, when the probability of occurrence of a PAPR greater than a predetermined value is $10^{-3}$, a low PAPR gain is generated as the number of taps is high.

Figure 17:
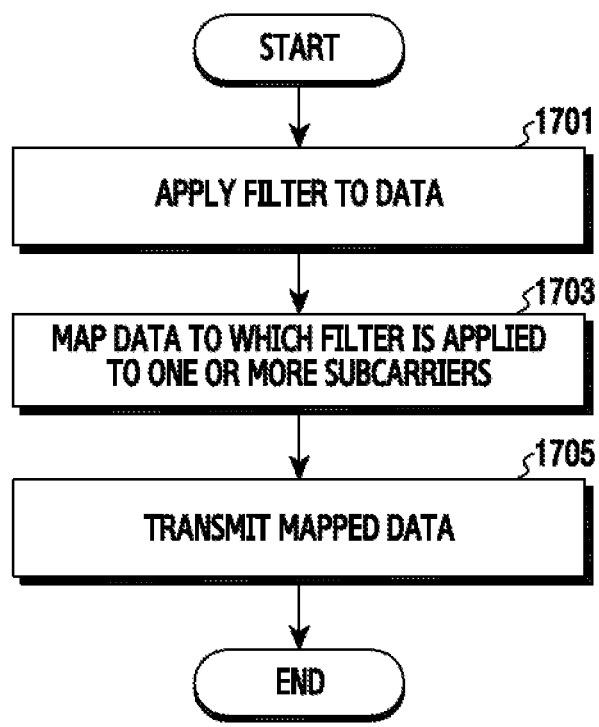
FIG. 17 is a diagram illustrating an operation method of reducing a PAPR by a transmitter in a wireless communication system according to various embodiments of the present disclosure.

FIG. 17 is a diagram illustrating an operation method of reducing a PAPR by a transmitter in a wireless communication system according to various embodiments of the present disclosure.

Referring to FIG. 17, in operation 1701, the transmitter 110 applies a filter to data. According to some embodiments of the present disclosure, the filter may be determined based on the reception characteristics and the reception performance of the receiver 120. According to other embodiments of the present disclosure, when the number of at least one subcarrier is the same as the number of at least one symbol included in data, the filter may have, as a coefficient, a value obtained by sampling a predetermined polynomial a number of times equal to the number of at least one symbol. When the number of at least one subcarrier is greater than the number of at least one symbol, the filter may have, as a coefficient, a value obtained by sampling the predetermined polynomial a number of times equal to the number of at least one subcarrier. According to other embodiments of the present disclosure, the transmitter 110 changes at least one phase according to the amount of phase rotation of at least one symbol included in data, and may filter, using a filter, the data including the at least one symbol, the phase of which is changed. According to other embodiments of the present disclosure, when the number of at least one subcarrier is the same as the number of at least one symbol, the amount of phase rotation may be determined based on the number of the at least one symbol. When the number of the at least one subcarrier is greater than the number of the at least one symbol, the amount of phase rotation may be determined based on the number of the at least one symbol and the number of the at least one subcarrier.

In operation 1703, the transmitter 110 may map data to which the filter is applied to at least one subcarrier. According to some embodiments of the present disclosure, the filter may include a circular convolution filter which is determined based on the number of at least one symbol included in the data.

In operation 1705, the transmitter 110 may transmit the mapped data to the receiver 120.

Figure 18:
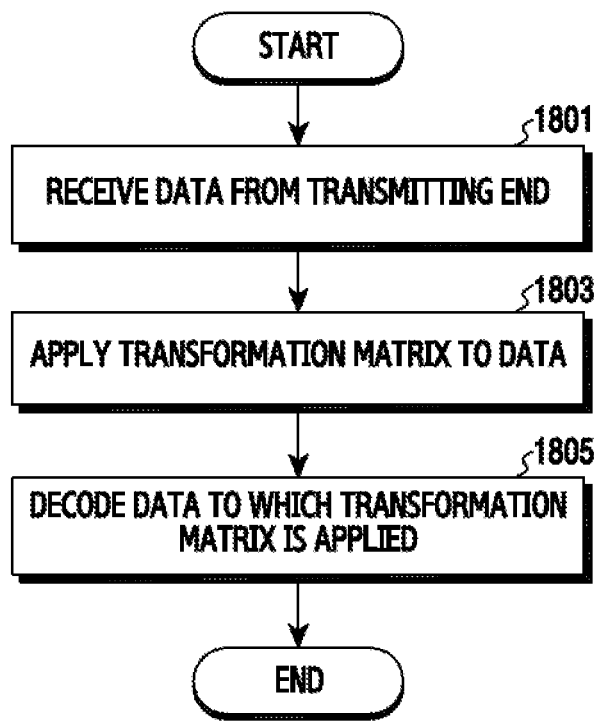
FIG. 18 is a diagram illustrating an operation method of reducing a PAPR by a receiver in a wireless communication system according to various embodiments of the present disclosure.

FIG. 18 is a diagram illustrating an operation method of reducing a PAPR by a receiver in a wireless communication system according to various embodiments of the present disclosure.

Referring to FIG. 18, in operation 1801, the receiver 120 receives data from the transmitter 110.

In operation 1803, the receiver 120 may apply a transformation matrix to data. According to some embodiments of the present disclosure, the transformation matrix may be determined based on a filter shared by the transmitter 110 and the receiver 120. Here, the filter may be determined based on the reception characteristics and the reception performance of the receiver 120. According to other embodiments of the present disclosure, when the number of at least one subcarrier allocated to the transmitter 110 is the same as the number of at least one symbol included in data, the filter may have, as a coefficient, a value obtained by sampling a predetermined polynomial a number of times equal to the number of at least one symbol. When the number of at least one subcarrier is greater than the number of at least one symbol, the filter may have, as a coefficient, a value obtained by sampling the predetermined polynomial a number of times equal to the number of at least one subcarrier. According to some embodiments of the present disclosure, the filter may include a circular convolution filter, which is determined based on the number of at least one symbol included in the data.

In operation 1805, the receiver 120 may decode the data to which the transformation matrix is applied. According to some embodiments of the present disclosure, the receiver 120 may change the phase of at least one symbol according to the amount of phase rotation of the at least one symbol, and may decode the at least one symbol, the phase of which is changed. According to other embodiments of the present disclosure, when the number of at least one subcarrier allocated to the transmitter 110 is the same as the number of at least one symbol, the amount of phase rotation may be determined based on the number of the at least one symbol. When the number of the at least one subcarrier is greater than the number of the at least one symbol, the amount of phase rotation may be determined based on the number of the at least one symbol and the number of the at least one subcarrier.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

In addition, the programs may be stored in an attachable storage device which is accessible through communication networks, such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a transmitter in a wireless communication system, the method comprising:
    applying a filter to data;
    mapping the data to which the filter is applied to at least one subcarrier; and
    transmitting the mapped data to a receiver,
    wherein the filter is determined based on a receiver characteristic and reception performance of the receiver, and
    wherein the filter includes, as at least one coefficient, at least one value obtained by sampling a predetermined polynomial a number of times equal to a number of at least one symbol if a number of the at least one subcarrier is a same as the number of the at least one symbol included in the data.

2. The method of claim 1,
wherein the filter includes, as the at least one coefficient, at least one value obtained by sampling the predetermined polynomial a number of times equal to a number of the at least one subcarrier if the number of the at least one subcarrier is greater than the number of the at least one symbol.

3. The method of claim 1, wherein the applying of the filter to the data comprises:
changing a phase of at least one symbol included in the data based on an amount of phase rotation of the at least one symbol, and
filtering, using the filter, the data including the at least one symbol, the phase of which is changed.

4. The method of claim 3,
wherein the amount of phase rotation is determined based on a number of the at least one symbol if a number of the at least one subcarrier is a same as the number of the at least one symbol, and
wherein the amount of phase rotation is determined based on the number of the at least one symbol and the number of the at least one subcarrier if the number of the at least one subcarrier is greater than the number of the at least one symbol.

5. The method of claim 1, wherein the filter includes a circular convolution filter determined based on a number of at least one symbol included in the data.

6. A transmitting apparatus in a wireless communication system, the transmitting apparatus comprising:
a transmitter; and
at least one processor coupled with the transmitter,
wherein the at least one processor is configured to control to:
apply a filter to data,
map the data to which the filter is applied to at least one subcarrier, and
transmit the mapped data to a receiver, and
wherein the filter is determined based on characteristic of a receiver and reception performance of the receiver, and
wherein the filter includes, as at least one coefficient, at least one value obtained by sampling a predetermined polynomial a number of times equal to a number of at least one symbol included in the data if a number of the at least one subcarrier is a same as the number of at least one symbol.

7. The transmitting apparatus of claim 6,
wherein the filter includes, as the at least one coefficient, at least one value obtained by sampling the predetermined polynomial a number of times equal to the number of the at least one subcarrier if the number of the at least one subcarrier is greater than the number of at least one symbol.

8. The transmitting apparatus of claim 6, wherein the at least one processor is further configured to control to:
change a phase of at least one symbol included in the data based on an amount of phase rotation of the at least one symbol, and
filter, using the filter, the data including the at least one symbol, the phase of which is changed.

9. The transmitting apparatus of claim 8,
wherein the amount of phase rotation is determined based on a number of the at least one symbol if a number of the at least one subcarrier is a same as the number of the at least one symbol, and
wherein the amount of phase rotation is determined based on the number of the at least one symbol and the number of the at least one subcarrier if the number of the at least one subcarrier is greater than the number of the at least one symbol.

10. The transmitting apparatus of claim 6, wherein the filter includes a circular convolution filter determined based on a number of at least one symbol included in the data.

11. A receiving apparatus in a wireless communication system, the receiving apparatus comprising:
a receiver; and
at least one processor coupled with the receiver,
wherein the at least one processor is configured to control to:
receive data from a transmitter,
apply a transformation matrix, and
decode data to which the transformation matrix is applied,
wherein the transformation matrix is determined based on a filter shared by the transmitter and the receiver,
wherein the filter is determined based on characteristic of the receiver and reception performance of the receiver, and
wherein the filter includes, as at least one coefficient, at least one value obtained by sampling a predetermined polynomial a number of times equal to a number of at least one symbol included in the data if a number of at least one subcarrier allocated to the transmitter for transmitting the data is a same as the number of at least one symbol.

12. The receiving apparatus of claim 11,
wherein the filter includes, as the at least one coefficient, at least one value obtained by sampling the predetermined polynomial a number of times equal to the number of at least one subcarrier if the number of at least one subcarrier is greater than the number of at least one symbol.

13. The receiving apparatus of claim 11, wherein the at least one processor is further configured to control to:
change a phase of at least one symbol included in the data based on an amount of phase rotation of the at least one symbol, and
decode the at least one symbol, the phase of which is changed.

14. The receiving apparatus of claim 13,
wherein the amount of phase rotation is determined based on a number of the at least one symbol if a number of at least one subcarrier allocated to the transmitter is a same as the number of the at least one symbol, and
wherein the amount of phase rotation is determined based on the number of the at least one symbol and the number of the at least one subcarrier if the number of the at least one subcarrier is greater than the number of the at least one symbol.

15. The receiving apparatus of claim 11, wherein the filter includes a circular convolution filter determined based on a number of at least one symbol included in the data.

* * * * *